United States Patent
Varoglu et al.

(10) Patent No.: US 9,717,065 B2
(45) Date of Patent: Jul. 25, 2017

(54) INDOOR REMOTE TRIGGERED LOCATION SCANNING

(71) Applicant: Apple Inc., Cupertino, CA (US)

(72) Inventors: Devrim Varoglu, Santa Clara, CA (US); Michael U. Kim, San Francisco, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 14/137,773

(22) Filed: Dec. 20, 2013

(65) Prior Publication Data

US 2015/0181548 A1 Jun. 25, 2015

(51) Int. Cl.
| | | |
|---|---|---|
| *H04W 64/00* | (2009.01) | |
| *H04W 4/04* | (2009.01) | |
| *H04W 4/00* | (2009.01) | |
| *H04W 76/02* | (2009.01) | |
| *H04W 12/08* | (2009.01) | |
| *H04L 29/06* | (2006.01) | |
| *H04L 29/08* | (2006.01) | |

(52) U.S. Cl.
CPC .......... *H04W 64/00* (2013.01); *H04W 4/008* (2013.01); *H04W 4/04* (2013.01); *H04L 63/104* (2013.01); *H04L 67/104* (2013.01); *H04W 12/08* (2013.01); *H04W 76/023* (2013.01); *H04W 76/027* (2013.01)

(58) Field of Classification Search
CPC ....... H04W 80/04; H04W 64/00; H04W 4/04; H04W 4/008; H04W 12/08; H04W 76/027; H04W 76/023; H04L 63/104; H04L 67/104
See application file for complete search history.

(56) References Cited

U.S. PATENT DOCUMENTS

| 8,000,724 B1 * | 8/2011 | Rayburn | G01S 5/0027 370/310 |
| 8,989,053 B1 * | 3/2015 | Skaaksrud | H04W 12/06 370/255 |

* cited by examiner

*Primary Examiner* — Joseph Dean, Jr.
(74) *Attorney, Agent, or Firm* — Fish & Richardson P.C.

(57) ABSTRACT

In some implementations, wireless transceivers ("nodes") can be located throughout a building. In some implementations, an originating mobile device can request the current location of a target mobile device. In some implementation, if a direct connection cannot be established between the originating mobile device and the target mobile device, the originating mobile device can send the location request to one or more nodes in the building. The nodes can relay the location request to the target mobile device. The target mobile device can determine the target mobile device's current location and send the current location of the target mobile device back to the originating mobile device through the nodes.

21 Claims, 18 Drawing Sheets

INDOOR REMOTE TRIGGERED LOCATION SCANNING

TECHNICAL FIELD

The disclosure generally relates to location sharing between devices.

BACKGROUND

Mobile devices are often configured with hardware and software for determining a location of the mobile devices. Typical location determining mechanisms use signals received from global navigation satellite systems (GNSS), cellular transceivers and other wireless technologies. Often these location determining mechanisms work well outdoors but have limited effectiveness in indoor locations.

SUMMARY

In some implementations, wireless transceivers ("nodes") coupled to computing devices can be located throughout a building. The nodes can be fixed nodes positioned statically at known locations throughout the building. The nodes can be mobile nodes that are moving throughout the building. The location of the mobile nodes can be dynamically determined as the mobile nodes move throughout the building based on signals received from the fixed nodes.

In some implementations, an originating mobile device can request the current location of a target mobile device. If the target mobile device is within wireless signal range of the originating mobile device, a direct peer-to-peer connection can be established to request the location of the target mobile device. The target mobile device can perform trilateration (or other location determining method) based on signals received from nodes in the building to determine the location of the target mobile device. The target mobile device can transmit the current location of the target mobile device to the originating mobile device through the direct peer-to-peer connection.

In some implementation, if a peer-to-peer connection cannot be established between the originating mobile device and the target mobile device, the originating mobile device can send the location request to one or more nodes in the building. The nodes can relay the location request to the target mobile device. The target mobile device can determine the target mobile device's current location and send the current location of the target mobile device back to the originating mobile device through the nodes.

In some implementations, a mobile device can transmit a message (e.g., a breadcrumb) that includes an identifier of the mobile device, the mobile device's current location and an authorization token to nodes as the mobile device moves throughout the building. Each node that receives the mobile device's identifier, location and authorization token can store the mobile device identifier, location, token and a timestamp in a database associated with the node. An authorized mobile device, as determined based on the token, can receive the stored mobile device information from a node. The authorized mobile device can receive the breadcrumb data from one or more nodes and determine a path along which the mobile device has traveled based on the stored location data.

Particular implementations provide at least the following advantages: A user of a mobile device can quickly determine a current location of a friend or family member inside a building by requesting that the friend's mobile device transmit the location of the friend's mobile device to the user. A user of a mobile device can quickly determine a path along which a friend has traveled through a building.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Enabling Location Sharing

Figure 1:
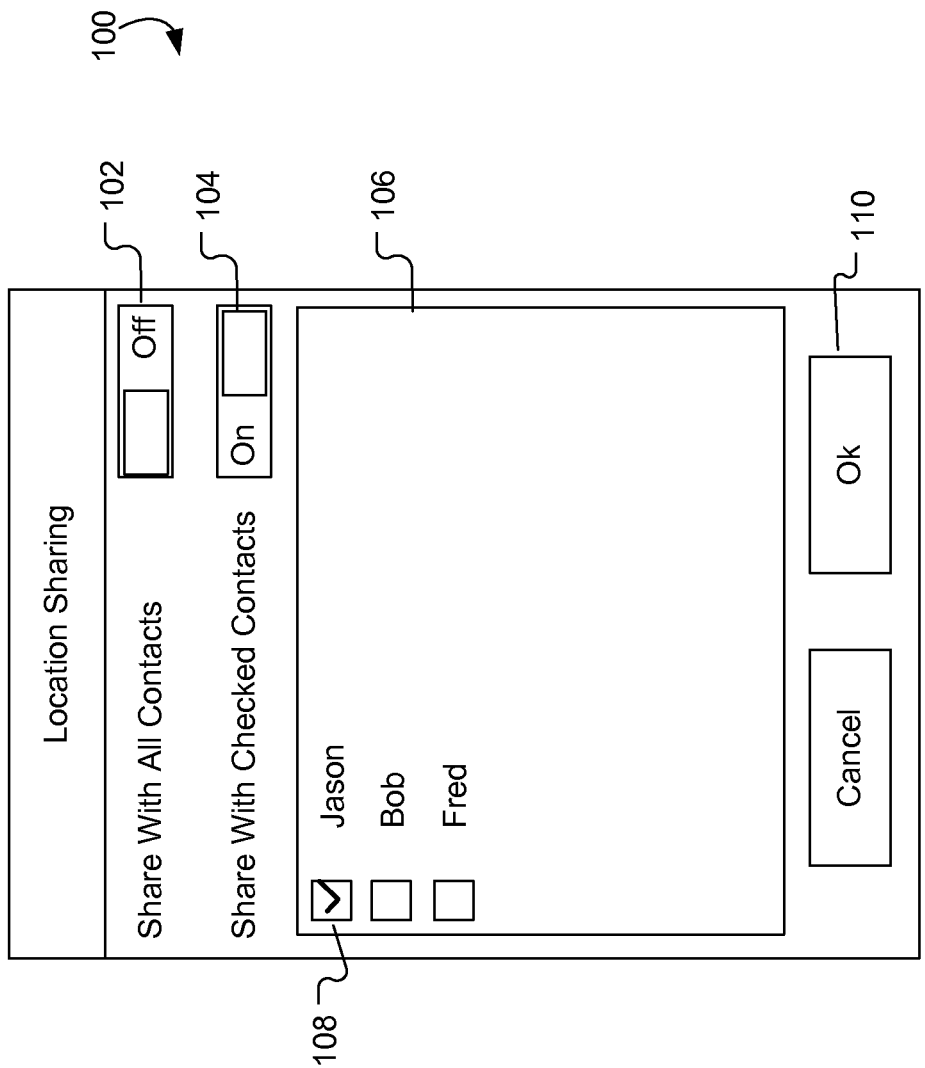
FIG. 1 illustrates an example graphical user interface of a mobile device for enabling location sharing with other mobile devices.

FIG. 1 illustrates an example graphical user interface (GUI) 100 of a mobile device for enabling location sharing with other mobile devices. For example, a user can invoke GUI 100 from a settings interface of the mobile device. GUI 100 can include a graphical object 102 that a user can select to enable or disable location sharing with all contacts stored on the mobile device. For example, when the share with all contacts feature is enabled, the mobile device will send location information to anybody (e.g., the mobile device associated with anybody) in the contacts database stored on the mobile device who requests location information from the mobile device.

In some implementations, GUI 100 can include graphical object 104 for enabling location sharing with selected contacts in the mobile device's contacts database. For example, if the user selects graphical object 104 to enable the share with checked contacts feature, the mobile device will share the current location of the mobile device with only the contacts that are checked (e.g., contact 108) in the contacts list 106.

In some implementations, once the user has selected to share the location of the user's mobile device with contacts (either all contacts or selected contacts) by selecting graphical object 110, the user's mobile device can transmit a request to the mobile devices of the contacts to request that the contacts approve or authorize location sharing between devices. For example, if contact 108 is selected for location sharing, the user's mobile device can send a location sharing request to the contact's mobile device (e.g., using email, SMS message, peer-to-peer connection, or other network connection).

Upon receipt of the location sharing request, a prompt can be displayed on the contact's mobile device requesting approval of the contact to enable location sharing with the user. If contact 108 approves and enables location sharing with the user, the mobile devices can exchange mobile device identifiers (e.g., the device's media access control 'MAC' address), encrypted/signed tokens, public/private keys and/or other data that can be used to identify, authenticate and/or determine authorization of the respective devices. Once exchanged between the user's device and the contact's device, the device identifiers and authorization tokens can be stored at the respective devices for future use. For example, the device identifier (e.g., MAC address) and token (e.g., encrypted token, public/private key, etc.) received from a contact can be stored with the contact's information in the contacts database (e.g., address book application) on the user's mobile device.

Requesting Contact's Location

Figure 2:
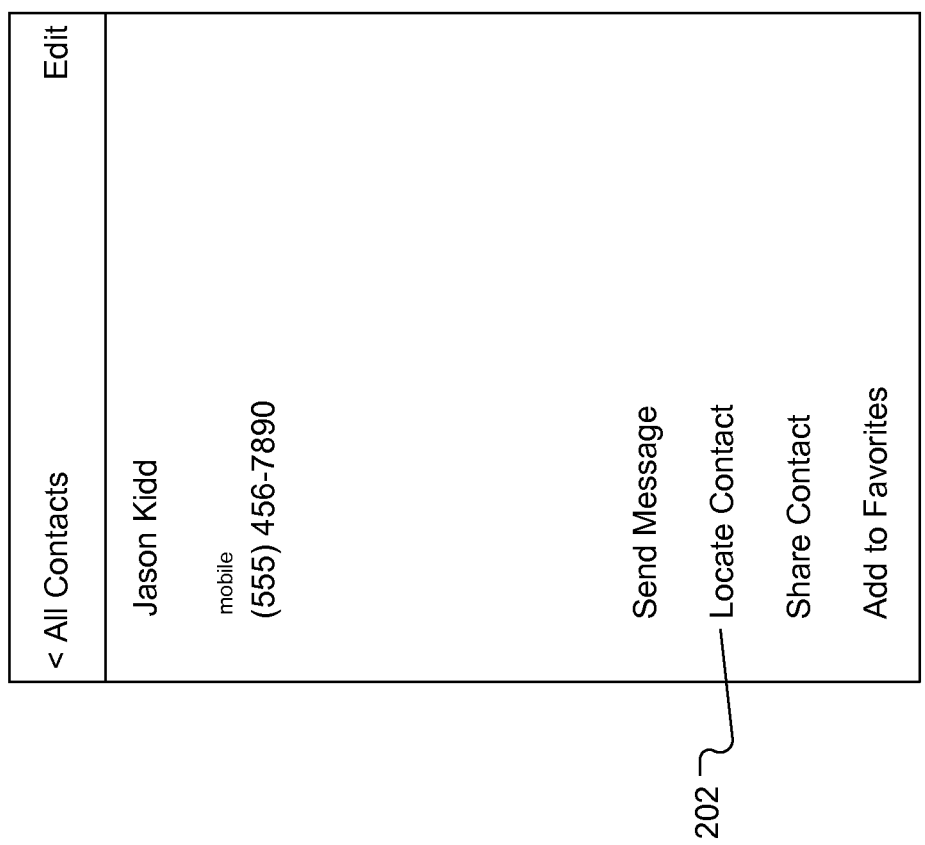
FIG. 2 illustrates an example graphical user interface for requesting the current location of a contact.

FIG. 2 illustrates an example graphical user interface 200 for requesting the current location of a contact. For example, a user can invoke GUI 200 from an address book application executing on the user's mobile device. GUI 200 can present contact information for a contact selected from the address book application, for example. In some implementations, GUI 200 can include selectable object 108 for remotely triggering a location scan (location determination) on the contact's mobile device. For example, a user can select graphical object 108 to request the location of a contact's mobile device. In response to the selection, the user's mobile device can transmit an identifier associated with the contact's mobile device and an authorization token to the contact's mobile device. Once the contact's mobile device determines that the user's mobile device is authorized to receive the requested location information (e.g., based on the token), the contact's mobile device can determine its location and can transmit the location information back to the user's mobile device for presentation to the user, as described further below.

Determining a Contact's Location

Figure 3:
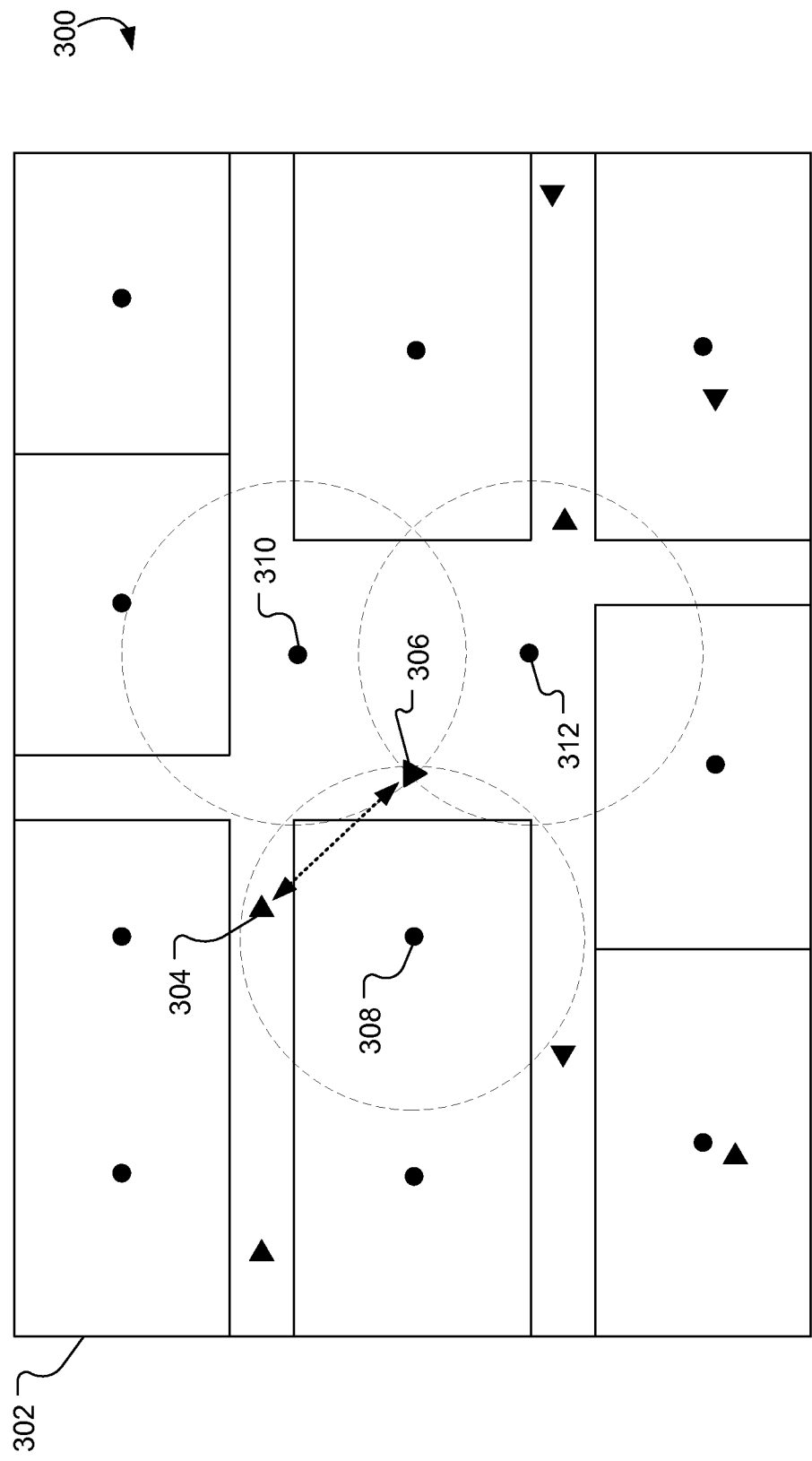
FIG. 3 illustrates an example system for remotely triggering from an originating mobile device a location scan at a target mobile device using direct a peer-to-peer connection.

FIG. 3 illustrates an example system 300 for remotely triggering from an originating mobile device a location scan at a target mobile device using direct a peer-to-peer connection. System 300 can include nodes (e.g., wireless transceivers, Bluetooth/Bluetooth LE devices, Wi-Fi access points, other mobile devices, etc.) deployed throughout building 302. The nodes can include fixed nodes (dots) and mobile nodes (triangles). For example, fixed nodes can be stationary nodes (Bluetooth transceivers, Wi-Fi access points, etc.) at known locations throughout building 302. Mobile nodes can be mobile devices (e.g., smartphones, etc.) that include wireless transceivers (e.g., Bluetooth/Bluetooth LE, Wi-Fi, radio, etc.). In some implementations, communication between nodes can be performed using a peer-to-peer connection (e.g., Bluetooth/Bluetooth LE). For example, fixed nodes can communicate directly with other fixed nodes in the building using a peer-to-peer connection. In some implementations, communication between nodes can be performed using wired or wireless network connections between nodes (e.g., local area network, wide area network, internet, etc.). For example, the fixed nodes within a building can all be connected to each other through a local area network and relay location requests through the local area network or through peer-to-peer wireless connections.

In some implementations, an originating mobile device (e.g., node 304) can remotely trigger location scanning at a target mobile device (e.g., node 306). For example, the user of the originating mobile device 304 can interact with GUI 200 of FIG. 2 to request the location of the target mobile device 306 and remotely trigger a location scan at the target mobile device 306. If the originating mobile device 304 is close enough (e.g., within a threshold distance, within wireless range) to target mobile device 306, the originating mobile device 304 can make the location request using a peer-to-peer (e.g., Bluetooth LE) connection.

In some implementations, when target mobile device 306 receives the location request from originating mobile device 304, target mobile device 306 can determine the current location of target mobile device 306. For example, target mobile device 306 can perform trilateration to determine the current location of target mobile device 306 within building 302.

To perform trilateration, target mobile device 306 can receive wireless signals from nearby fixed nodes 308, 310, 312 at known locations in building 302, analyze the signal strength of the received signals to determine distance between each node and the target mobile device 306, and use the known positions of the nodes and the distances between the nodes and the target mobile device 306 to generate overlapping circles or spheres that can be used to determine the current location of the target mobile device 306 within building 302. Once the current location of target mobile device 306 is determined, target mobile device 306 can transmit its current location back to originating mobile device 304 using the peer-to-peer connection. Using trilateration techniques, the target mobile device 306 can determine a nearly accurate location based on signals received from at least three nodes.

In some implementations, target mobile device 306 can receive building layout information from the fixed nodes positioned throughout building 302. For example, when target mobile device 306 enters building 302 and establishes a wireless connection with a fixed node in building 302, the fixed node can transmit the layout of the building and the locations of the fixed nodes throughout the building to target mobile device 306. Target mobile device 306 can store the building layout information and the fixed node location information (e.g., fixed node identifier and location) in local non-volatile storage on target mobile device 306, for example. When the target mobile device 306 receives a wireless signal from a fixed node, the wireless signal can include the identifier of the transmitting fixed node and the target mobile device 306 can look up the location of the fixed node by comparing the fixed node identifier to the stored fixed node location information. The target mobile device can determine a distance between the fixed node and the target mobile device based on the signal strength of the signal received from the fixed node.

Figure 4:
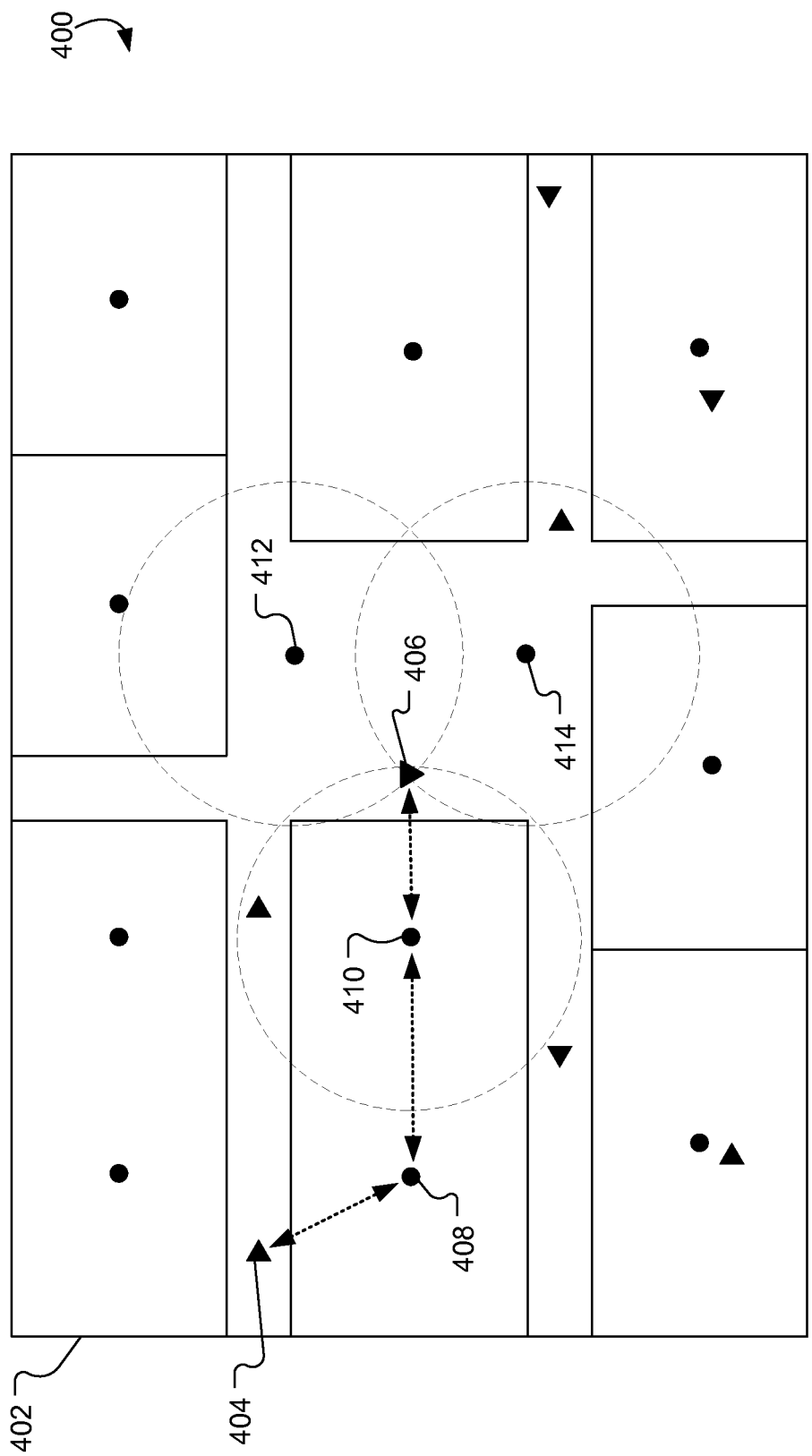
FIG. 4 illustrates an example system for remotely triggering from an originating mobile device a location scan at a target mobile device using intermediate fixed nodes.

FIG. 4 illustrates an example system 400 for remotely triggering from an originating mobile device a location scan at a target mobile device using intermediate fixed nodes. In some implementations, an originating mobile device (e.g., node 404) can remotely trigger location scanning at a target mobile device (e.g., node 406) to determine the location of target mobile device 406 within building 402. For example, the user of the originating mobile device 404 can interact with GUI 200 of FIG. 2 to request the location of the target mobile device 406 and remotely trigger a location scan at the target mobile device 406. If the originating mobile device 404 is not close enough (e.g., within a threshold distance, within wireless range) to target mobile device 406 to establish a direct peer-to-peer connection with target mobile device 406, the originating mobile device 404 can make the location request using intermediate nodes (e.g., nodes 408 and 410).

In some implementations, when originating mobile device 404 cannot establish a direct peer-to-peer connection with target mobile device 406, originating mobile device 404 can broadcast the location request to nearby nodes (e.g., node 408). The location request can include an identifier of the target mobile device 406, for example. If node 408 can establish a connection to target mobile device 406, then node 408 can transmit the location request to target mobile device 406. If node 408 cannot establish a connection with target mobile device 406, then node 408 can retransmit the location request to other nearby nodes (e.g., node 410). If a node (e.g., node 410) can establish a connection (e.g., peer-to-peer or network) with target mobile device 406, then node 410 can transmit the location request to target mobile device 406. For example, a node can establish a connection with a target mobile device when the node has detected wireless signals broadcast by the target mobile device that include the target mobile device identifier that was provided by the originating mobile device in the location request. If the node detects wireless signals from the target mobile device, then the target mobile device is within wireless range of the target mobile device and a connection to the target mobile device can be established.

In some implementations, when target mobile device 406 receives a location request from an intermediate node (e.g., node 410), target mobile device 406 can determine its current location within the building 402 and transmit its current location back to originating mobile device 404 through the intermediate nodes (e.g., node 410, node 408, etc.). For example, target mobile device 406 can receive wireless signals from fixed nodes 410, 412 and 414 and perform trilateration calculations to determine the current location of target mobile device 406 within building 402, as described above.

Figure 5:
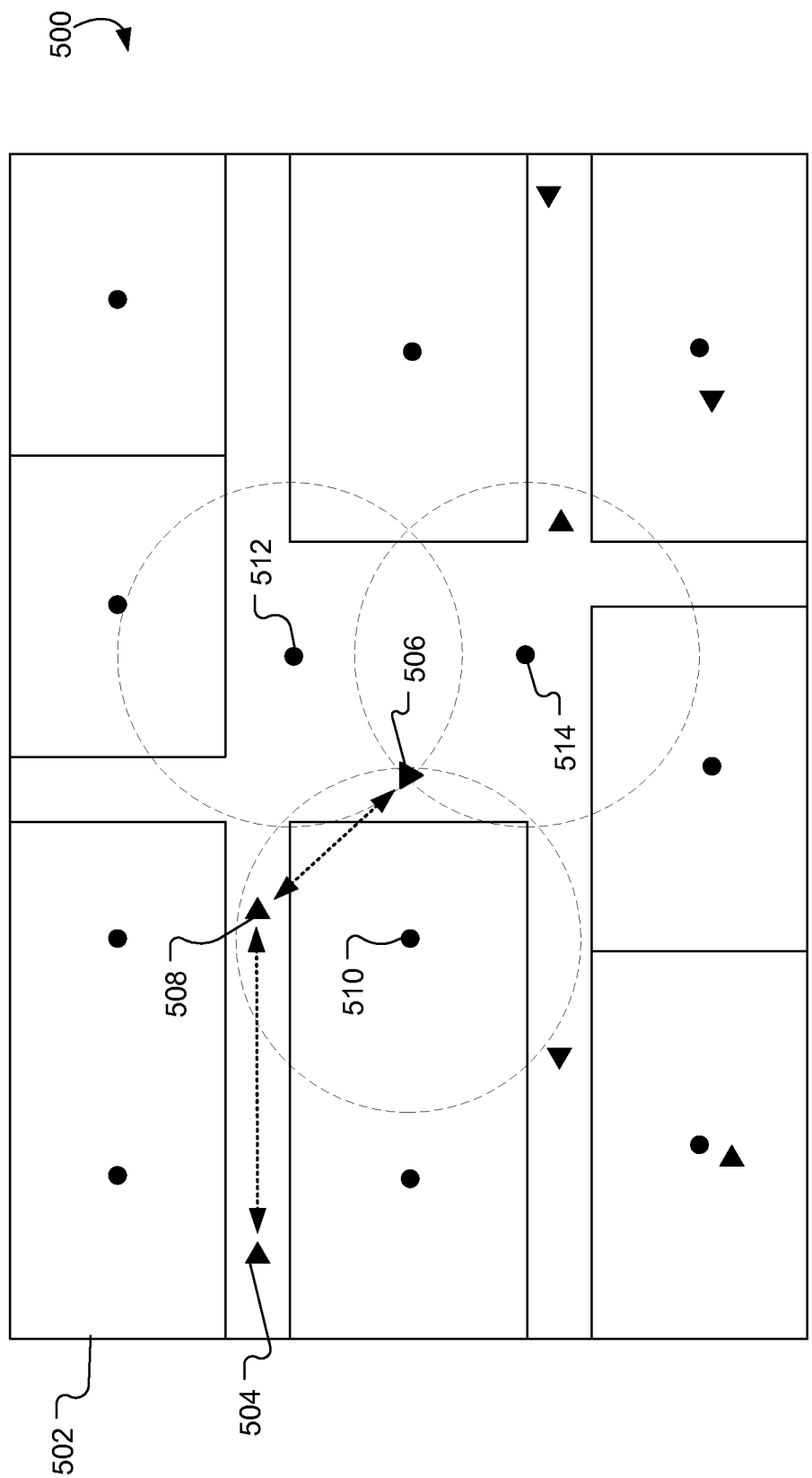
FIG. 5 illustrates an example system for remotely triggering from an originating mobile device a location scan at a target mobile device using intermediate mobile nodes.

FIG. 5 illustrates an example system 500 for remotely triggering from an originating mobile device a location scan at a target mobile device using intermediate mobile nodes. In some implementations, an originating mobile device (e.g., node 504) can remotely trigger location scanning at a target mobile device (e.g., node 506) to determine the location of target mobile device 506 within building 502. For example, the user of the originating mobile device 504 can interact with GUI 200 of FIG. 2 to request the location of the target mobile device 506 and remotely trigger a location scan at the target mobile device 506. If the originating mobile device 504 is not close enough (e.g., within a threshold distance) to target mobile device 506 to establish a direct peer-to-peer connection with target mobile device 506, the originating mobile device 504 can transmit the location request though intermediate nodes (e.g., mobile node 508). For example, mobile node 508 can receive the location scan request and retransmit the location scan request to target mobile device 506.

In response to receiving the location scan request, target mobile device can scan for (detect) wireless signals from nearby nodes (e.g., nodes 510, 512 and 514) and perform trilateration calculations to determine the current location of the target mobile device 506 within building 502, as described above with reference to FIGS. 3 and 4. Once target mobile device 506 determines its current location within building 502, target mobile device 506 can transmit its current location back to originating mobile device 504 through the intermediate nodes (e.g., mobile node 508). In some implementations, the target mobile device 506 can encrypt or otherwise obfuscate the current location of the target mobile device 506 in the response to the location request. For example, the target mobile device can encrypt the location information in the response message using the previously exchanged token, public key/private key information so that the intermediate nodes cannot read the location information but the authorized originating node can decrypt and read the location information in the response message.

Figure 6:
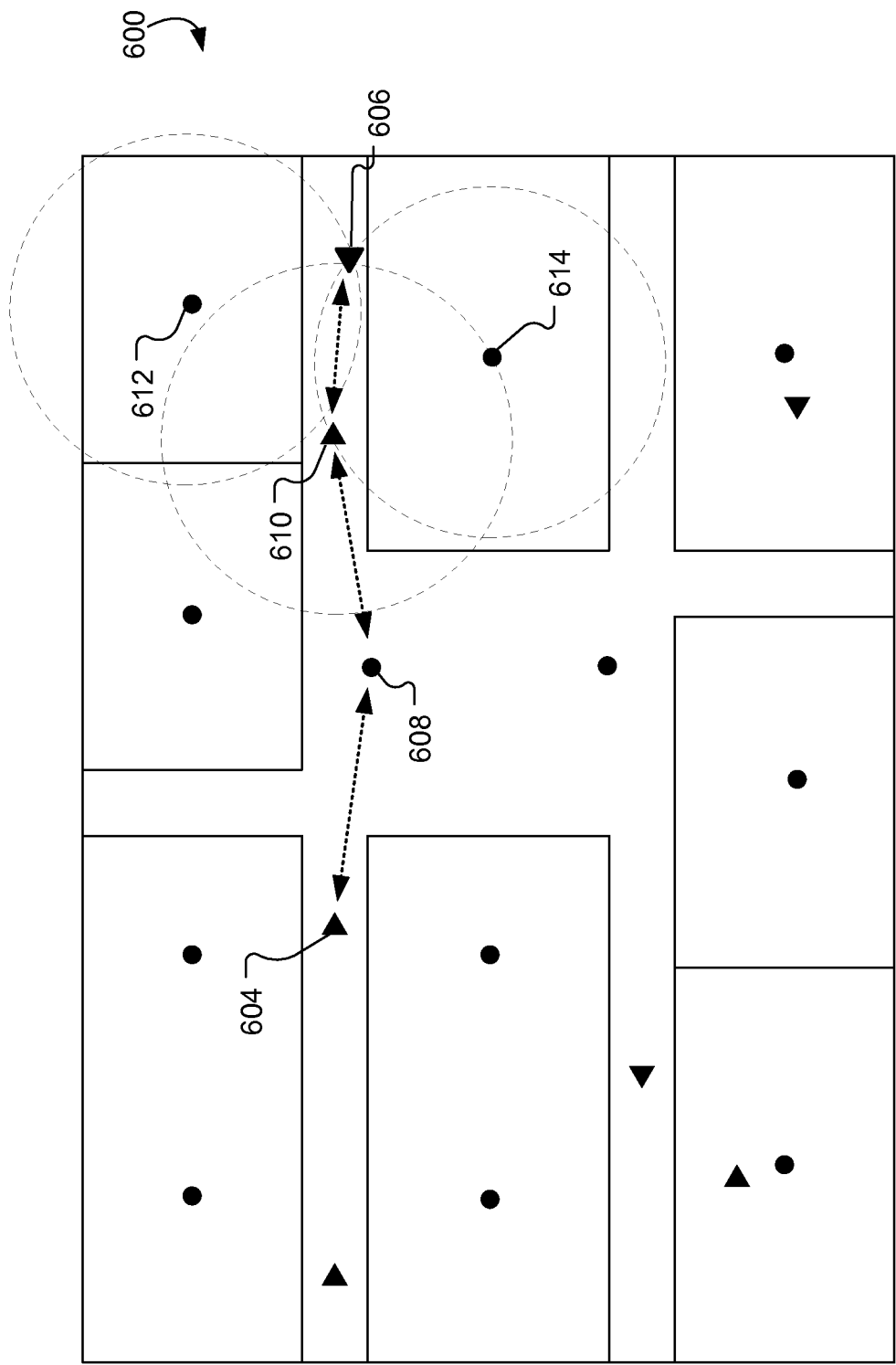
FIG. 6 illustrates an example system for determining a current location of a target mobile device based the determined location of a nearby mobile node.

FIG. 6 illustrates an example system 600 for determining a current location of a target mobile device based the determined location of a nearby mobile node. In some implementations, an originating mobile device (e.g., node 604) can remotely trigger location scanning at a target mobile device (e.g., node 606) to determine the location of target mobile device 606 within building 602. For example, the user of the originating mobile device 604 can interact with GUI 200 of FIG. 2 to request the location of the target mobile device 606 and remotely trigger a location scan at the target mobile device 606. If the originating mobile device 604 is not close enough (e.g., within a threshold distance) to target mobile device 606 to establish a direct peer-to-peer connection with target mobile device 606, the originating mobile device 604 can transmit the location request though intermediate nodes (e.g., fixed node 608 and mobile node 610). Upon receipt of the location request, target mobile device 606 can perform trilateration to determine the current location of target mobile device 606.

In some implementations, target mobile device 606 can use the determined location of a mobile node in the trilateration location determination calculations. For example, target mobile device 606 may only be able to connect to one or two fixed nodes (e.g., fixed node 612 and fixed node 614). Since trilateration location determination requires at least three nodes, the target mobile device 606 will not be able to calculate an accurate location using just the two fixed nodes. However, if there is a nearby mobile node (e.g., mobile node 610) that is able to calculate an accurate current location for mobile node 610 (e.g., using trilateration) then target mobile device 606 can communicate with mobile node 610 to determine the location of mobile node 610. For example, the mobile node can send its location information but withhold or obfuscate its identification information. Since the target mobile device 606 merely requires the location and signal strength information for the location determination, the identification information associated with mobile node 610 does not need to be shared with the target mobile device 606. The distance between mobile node 610 and target mobile device 606 can be estimated based on the signal strength of the signal received from mobile node 610. Once target mobile device 606 has the location and distance of the mobile node 610 and the locations and distances of fixed nodes 612 and 614, target mobile device 606 can estimate its current location and transmit its current location to originating mobile device 604 through intermediate nodes 608 and 610.

Figure 7:
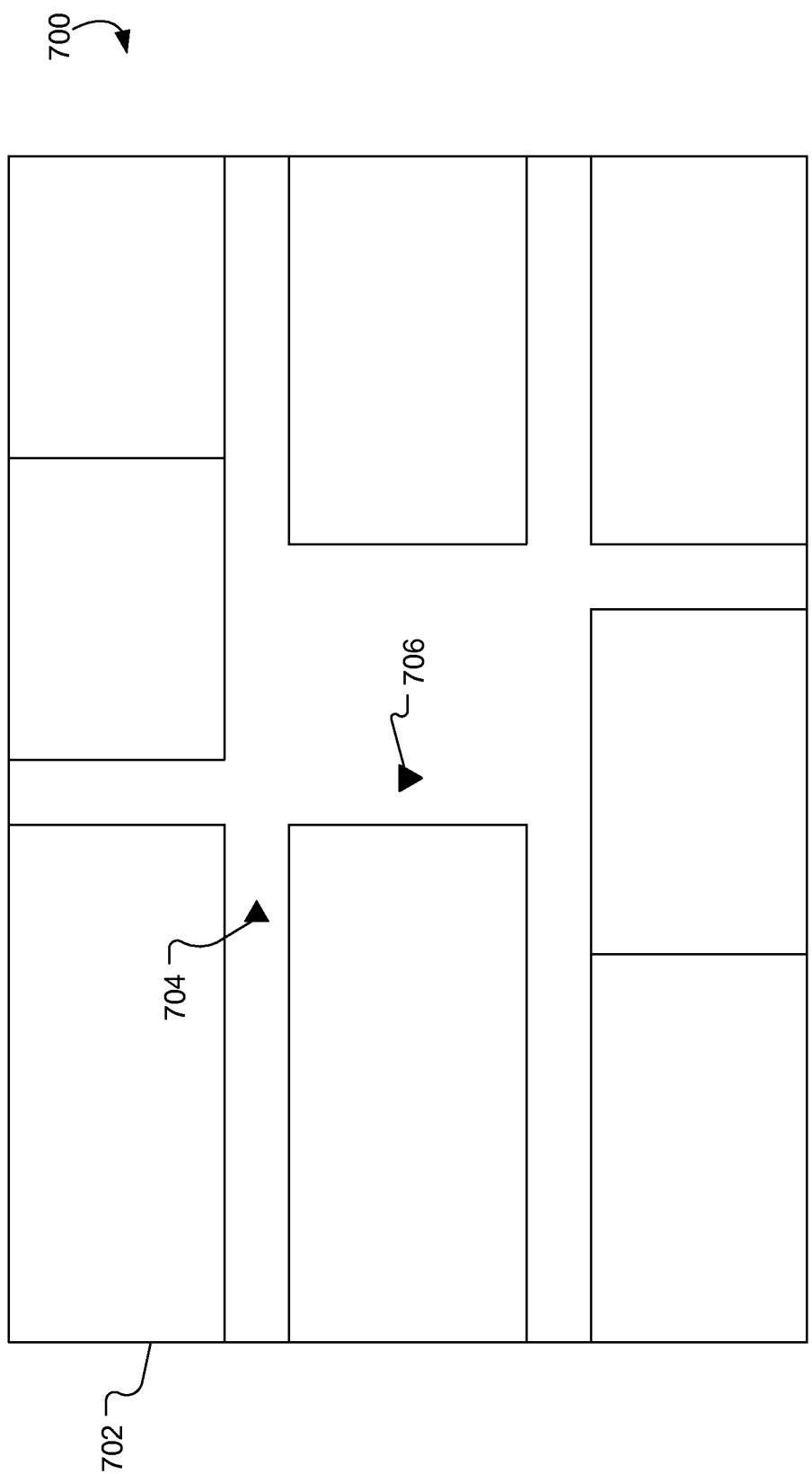
FIG. 7 illustrates an example graphical user interface for presenting target mobile device location information on an originating mobile device.

FIG. 7 illustrates an example graphical user interface 700 for presenting target mobile device location information on an originating mobile device. In some implementations, GUI 700 can be presented in response to receiving location information associated with a target mobile device, as described above. For example, the originating mobile device can use the building layout information obtained from the nodes within a building to present a graphical representation 702 (e.g., floor plan) of the building on a display of the originating mobile device. The originating mobile device can determine its location within the building (e.g., using fixed/mobile node signals and trilateration) and present a graphical object 704 that represents the current location of the originating mobile device in the building 702. The originating mobile device can use the received location information associated with the target mobile device to present a graphical object 708 representing the current location of the target mobile device within the building on the graphical representation 702 of the building. The user can then use the relative locations of the graphical objects 704 and 706 to determine how to navigate through the building to the location of the target mobile device.

Determining Area in Which Device is Located

Figure 8:
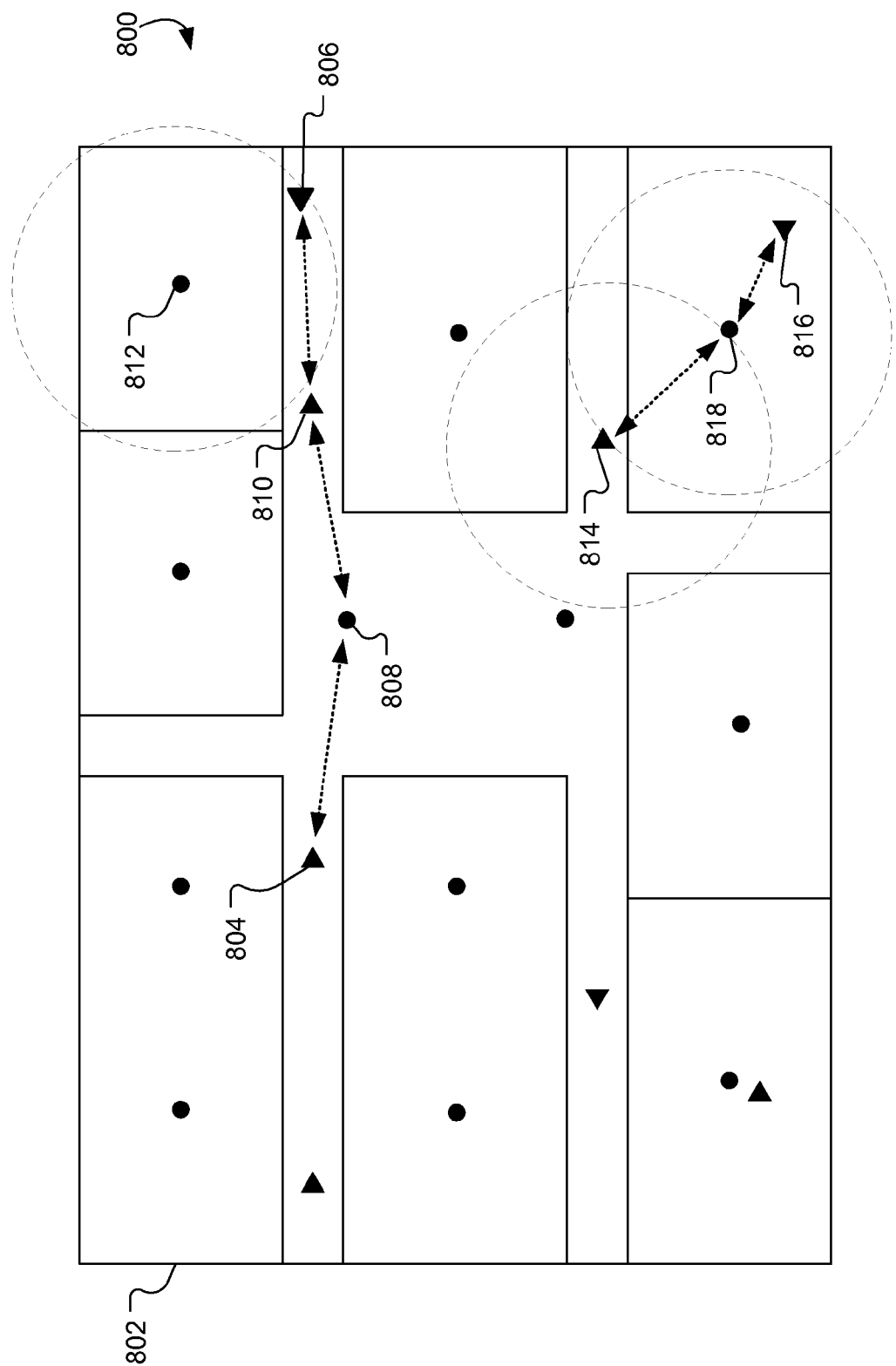
FIG. 8 illustrates an example system for determining a location of a target mobile device based signals received from a single node.

FIG. 8 illustrates an example system 800 for determining a location of a target mobile device based signals received from a single node. For example, to determine an accurate (precise) location of a mobile device using the trilateration techniques described above, the mobile device requires signals from three or more transmitters. When signals from only one transmitter are received, the mobile device can use the known location of the single transmitter and the distance between the transmitter and the mobile device (as derived from signal strength) to determine an area within the building in which the mobile device is located.

In some implementations, originating mobile device 804 can broadcast a request for the location of target mobile device 806. For example, originating mobile device 804 can attempt to make a direct peer-to-peer connection with target mobile device 806. If originating mobile device 804 is not within range of target mobile device 806 (e.g., originating mobile device 804 has not received or detected any wireless signals from target mobile device 806), then originating mobile device 804 can determine which nodes are within range of originating mobile device 804 and send the location request to the nodes. For example, target mobile device 804 can transmit a request for the location of target mobile device 806 to intermediate node 808 (e.g., fixed node 808). The location request can include a device identifier (e.g., MAC address, email address, etc.) associated with target mobile device 804, for example.

In some implementations, intermediate node 808 can retransmit the location request when intermediate node 808 cannot establish a direct connection to the target mobile device 806. For example, intermediate node 808 can monitor and analyze wireless signals to determine if intermediate node has received any wireless signals from target mobile device 806. If intermediate node 808 has received or is currently receiving wireless signals from target mobile device 806, then intermediate node 808 can establish a wireless connection to target mobile device 806 and retransmit the location request.

If intermediate node 808 cannot establish a connection with target mobile device 806, intermediate node 808 can detect nearby nodes within broadcast range of intermediate node 808 and retransmit the location request to the nearby nodes. For example, if intermediate node 808 has received wireless signals from mobile node 810, then intermediate node 808 can retransmit the location request to mobile node 810 (intermediate node 810). Intermediate node 810 can then determine if the target mobile device 806 identified in the location request is within range of intermediate node 810 by determining if intermediate node 810 has received or detected any wireless signals from target mobile device 810. If intermediate node 810 is receiving or detecting wireless signals from target mobile device 810, then intermediate node 810 can establish a communication link with target mobile device 810 and transmit the location request to target mobile device 810.

In some implementations, upon receiving the location request, target mobile device 806 can analyze signals from one or more nodes to determine the location of target mobile device. For example, the target mobile device 806 can analyze signals received from one or more nodes within building 802 to determine the identity of the nodes sending the signals and the strength of the received signals. Based on the identity of the node, the target mobile device can determine the location of the transmitting node, as described above. Based on the signal strength, the target mobile device 806 can estimate the distance between the transmitting node and the target mobile device. When signals from only one node (e.g., node 812) are detected by target mobile device 806, the target mobile device can estimate an area of the building in which the target mobile device 806 is located. For example, the estimated area can be identified based on the location of the transmitting node and the distance determined based on the received signal strength (e.g., within 100 feet of location of node 812).

Once the target mobile device 806 determines its approximate location, the target mobile device 806 can transmit its approximate location back to originating node 804. For example, target mobile device 806 can transmit its device identifier, the node identifier, and the received signal strength back to originating mobile device 804 through intermediate nodes 808 and 810.

When originating mobile device 804 receives the location information from target mobile device 806, the originating mobile device 804 can determine the area of the building in which target mobile device is currently located based on the node identifier and the received signal strength. For example, the node identifier can be used by the originating mobile device to determine the location of the node. The received signal strength can be used to determine how far from the node that the target mobile device 806 located. Based on the location and distance, the originating mobile device 804 can determine an approximate area in the building 802 in which the target mobile device 806 is located. In some implementations, instead of sending a node identifier and received signal strength, the target mobile device 806 can determine and send the location of the node and its distance from the node to the originating mobile device 804. The originating mobile device 804 can determine an area of the building 802 in which the target mobile device is located based on the location of the node and distance from the node to the target mobile device 806.

In some implementations, an originating mobile device can use the distance between the originating mobile device and an intermediate node to reduce the size of the area in which the target mobile device can be located. For example, if originating mobile device 814 and target mobile device 816 are communicating through a single intermediate node 818, when the location information indicates that target mobile device 816 is located in an area around intermediate node 818, the originating mobile device 814 can exclude from the location information the area that can be reached directly by originating mobile device 814. That is, the target mobile device cannot be located within an area where the broadcast range of the mobile device and the broadcast range of the intermediate node overlap. This overlapping area can excluded from the location estimation for target mobile device 816 because if target mobile device 816 was located within this area, the originating mobile device 814 would be able to establish a direct peer-to-peer connection with target mobile device 816. Since the target mobile device 816 is not within the overlapping area, the overlapping area can be excluded from the location estimation.

Figure 9:
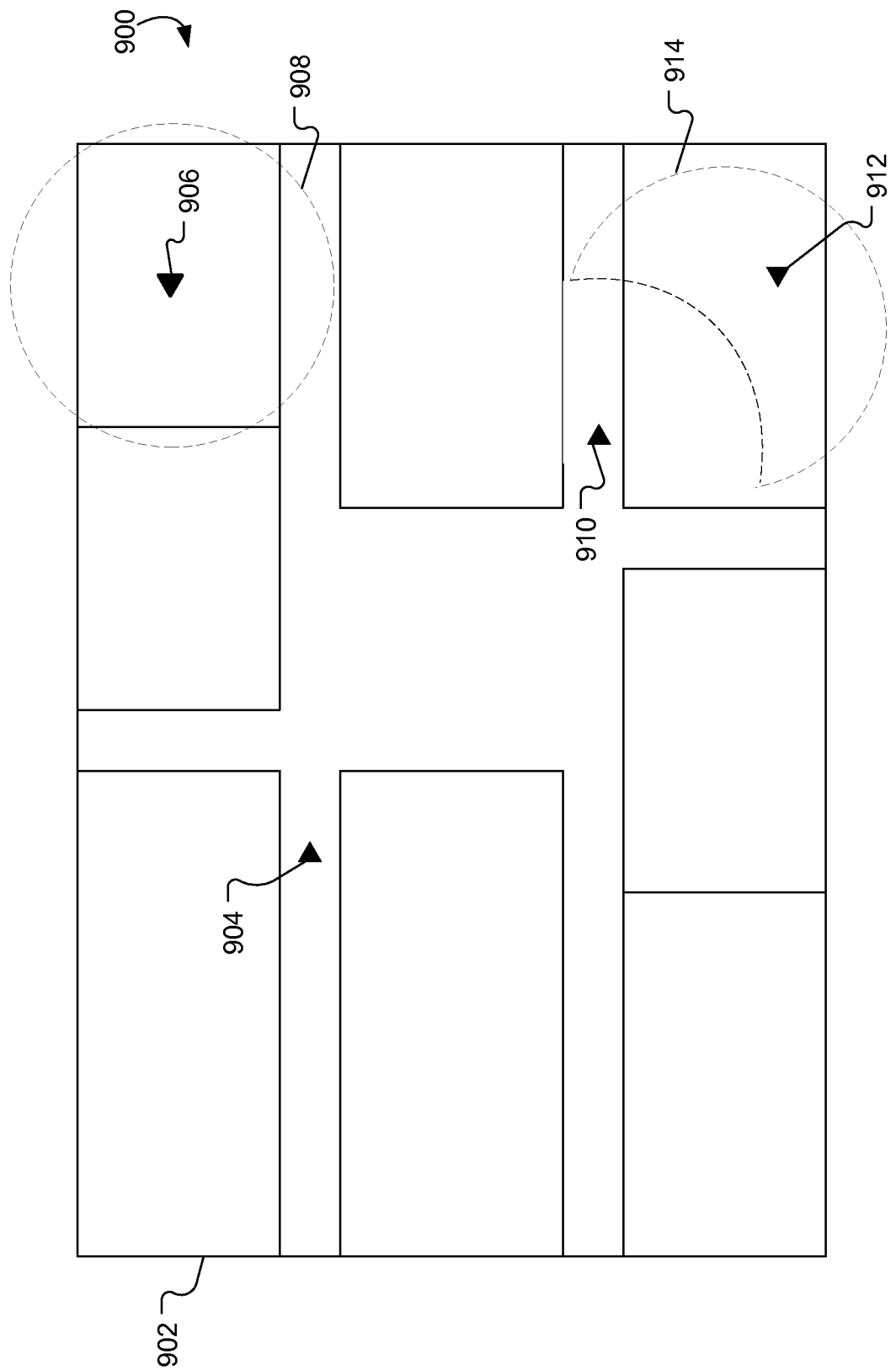
FIG. 9 illustrates an example graphical user interface indicating the estimated location of a target mobile device.

FIG. 9 illustrates an example graphical user interface 900 indicating the estimated location of a target mobile device. In some implementations, GUI 900 is displayed once location information is received from a target mobile device. For example, GUI 900 can indicate the estimated area where the target mobile device is located based on signals received from a single node. GUI 900 can include a graphical representation 900 of a building in which the originating mobile device 904/910 and the target mobile device 906/912 are located. The graphical representation 902 can include a graphical object 904/910 indicating the current location of the originating mobile device within the building. The graphical representation 902 can include a graphical object 906/912 indicating the estimated current location of the target mobile device. The graphical object 906/912 can include an indication 908/914 of the area of the building in which the target mobile device is located. For example, the indication 908/914 can be a line circumscribing the area, a shaded region or any other mechanism for indicating the area in which the target mobile device might be located.

In some implementations, the area of the building in which the target mobile device is located can be estimated based on a distance from a wireless node resulting in a circular/spherical area 908. In some implementations, the area of the building in which the target mobile device is located can be estimated based on a distance from a wireless node and a distance between the wireless node and the originating device. For example, overlapping circles (or spheres) can be drawn around the originating mobile device and the intermediate node. The overlapping area can be removed from the area of the circle (or sphere) around the intermediate node. The remaining portion of the circle (or sphere) around the intermediate node can be the location estimation, as shown by dashed line 914. Again, this approach excludes the area around the intermediate node that can be directly reached by the originating mobile device. For example, if the target mobile device was within the region directly reachable by the originating mobile device, the intermediate node would not be needed to retransmit the location request to the target mobile device.

Figure 10:
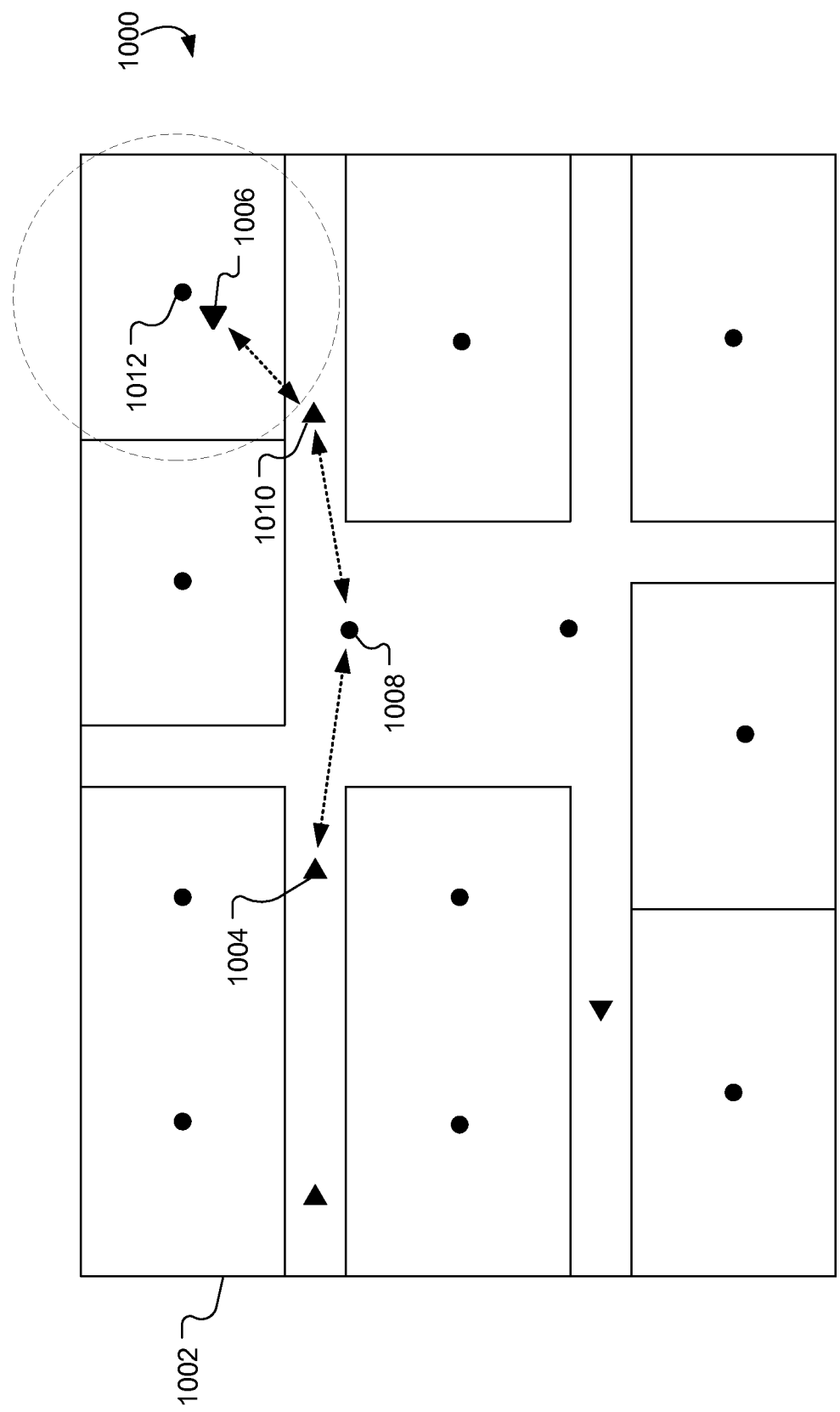
FIG. 10 illustrates an example system for determining a location of a target mobile device based signals received from a single node.

FIG. 10 illustrates an example system 1000 for determining a location of a target mobile device based signals received from a single node. For example, a user of originating mobile device 1004 can remotely trigger a location determination (scan) at a target mobile device 1006 by transmitting a location request through intermediate nodes 1008 and 1010, as described above. When target mobile device 1006 receives the location request, target mobile device 1006 can scan for wireless signals from nodes throughout building 1002. In some implementations, target mobile device 1006 will receive wireless signals from only one node (e.g., node 1012) in building 1010. Target mobile device 1006 can analyze the signals received from node 1012 to determine the node identifier for node 1012 and signal strength. Target mobile device 1006 can look up the location of node 1012 in the building layout information stored in the target mobile device, as described above. Target mobile device 1006 can determine the distance between target mobile device 1006 and node 1012 based on the signal strength. The higher/greater the signal strength, the closer the target mobile device 1006 is to node 1012. If the signal strength is greater than a threshold strength, the target mobile device 1006 can determine that the location of the target mobile device is the same as the location of node 1012. Once the target mobile device 1006 has determined that its location is the same as the location of node 1012, the target mobile device 1006 can transmit the location of node 1012 back to the originating mobile device 1004 as the current location of target mobile device 1006. Once the location of the target mobile device 1006 is determined, GUI 700 of FIG. 7 can be displayed to indicate the relative locations of originating mobile device 1004 and target mobile device 1006.

Figure 11:
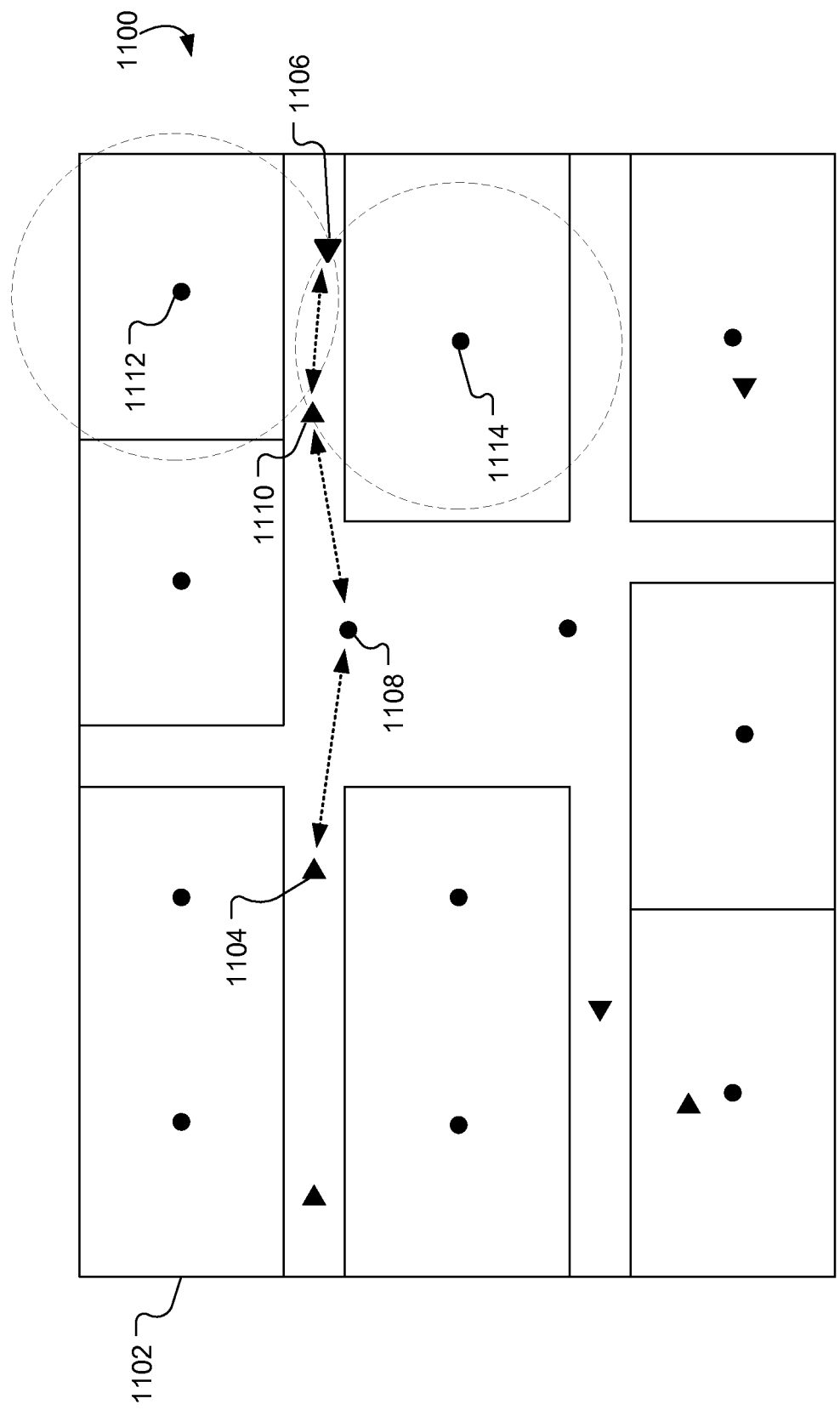
FIG. 11 illustrates an example system for determining a location of a target mobile device based signals received from two nodes.

FIG. 11 illustrates an example system 1100 for determining a location of a target mobile device based signals received from two nodes. For example, because a precise location estimate requires at least three nodes, signals from only two nodes can be used to determine an estimated area in which the target mobile device might be located within building 1102. In some implementations, originating mobile device 1104 can request the current location of target mobile device 1106 within building 1102. If the originating mobile device 1104 cannot establish a direct peer-to-peer connection with target mobile device 1106, then originating mobile device 1104 can transmit the location request through intermediate nodes 1108 and 1110, as described above. When target mobile device 1106 receives the location request, target mobile device 1106 can scan for nearby nodes. For example, the target mobile device 1106 can scan for nearby nodes by detecting and receiving wireless signals and determining which nodes transmitted the received signals. For example, the target mobile device 1106 can receive wireless signals from nodes 1112 and 1114, analyze the wireless signals to determine the node identifiers of nodes 112 and 114 and determine the strength of the signals received from nodes 1112 and 1114. Based on the node identifiers and the received signal strength, target mobile device 1106 can determine the respective locations of the nodes 1112 and 1114 and the distance between the target mobile device 1106 and each node 1112 and 1114. The target mobile device 1106 can then transmit the node location and distance information (or the node identifiers and signal strengths) to the originating mobile device 1104.

In some implementations, the originating mobile device 1104 can determine an estimate of the area within the building 1102 where the target mobile device 1106 is located. For example, the originating mobile device 1104 can use the node location and distance (radius) information (or node identifiers and signal strength information) of the two nodes to determine a circular or spherical area around node 1114 and a circular or spherical area around node 1112. The originating mobile device can determine an overlapping area (e.g., intersection) of the two circular or spherical areas. The originating mobile device 1104 can estimate that the current location of the target mobile device 1106 is within the overlapping or intersecting areas of the two circular or spherical areas, as illustrated by FIG. 12.

Figure 12:
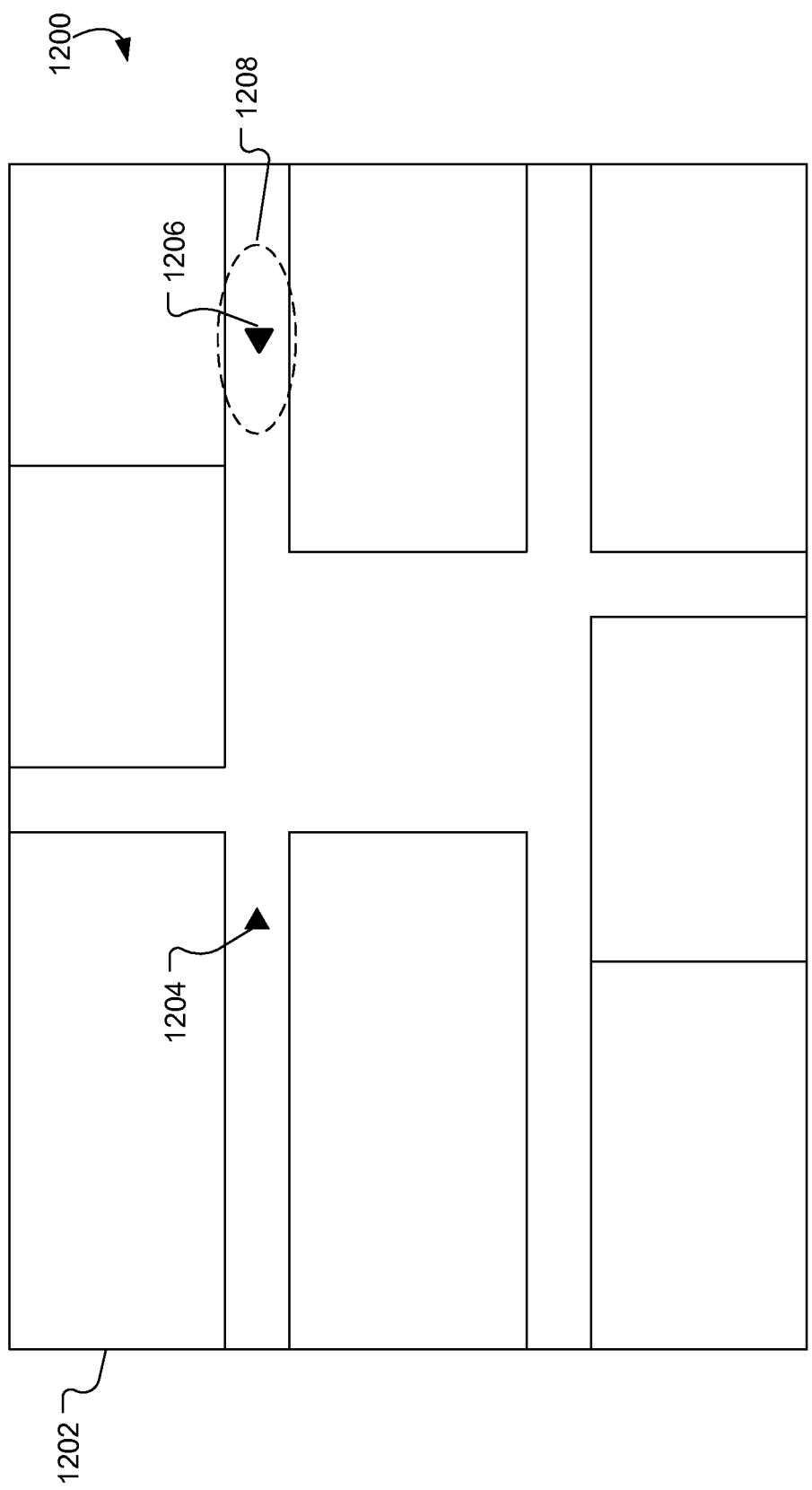
FIG. 12 illustrates an example graphical user interface for presenting on an originating mobile device an estimated location of a target mobile device.

FIG. 12 illustrates an example graphical user interface 1200 for presenting on an originating mobile device an estimated location of a target mobile device. For example, GUI 1200 can be presented by the originating mobile device when the originating mobile device receives the node location and distance information for the two nodes from the target mobile device. In some implementations, GUI 1200 can present a graphical representation 1202 of a building. The graphical representation 1202 can include a graphical object 1204 representing the current location of the originating mobile device within the building. The graphical representation 1202 can include a graphical object 1206 representing an estimate of the current location of the target mobile device within the building. The graphical representation can include an indication 1208 of an area within the building where the target mobile device is estimated to be currently located. For example, the indication 1208 can be a line that circumscribes the area in the building where the target mobile device is located. The indication 1208 can be a shaded area within the building that indicates where the target mobile device is located. The area can be determined by determining the intersection of circles or spheres defined by the location of the two nodes and the distances between the nodes and the target mobile device, as described above with reference to FIG. 11.

Figure 13:
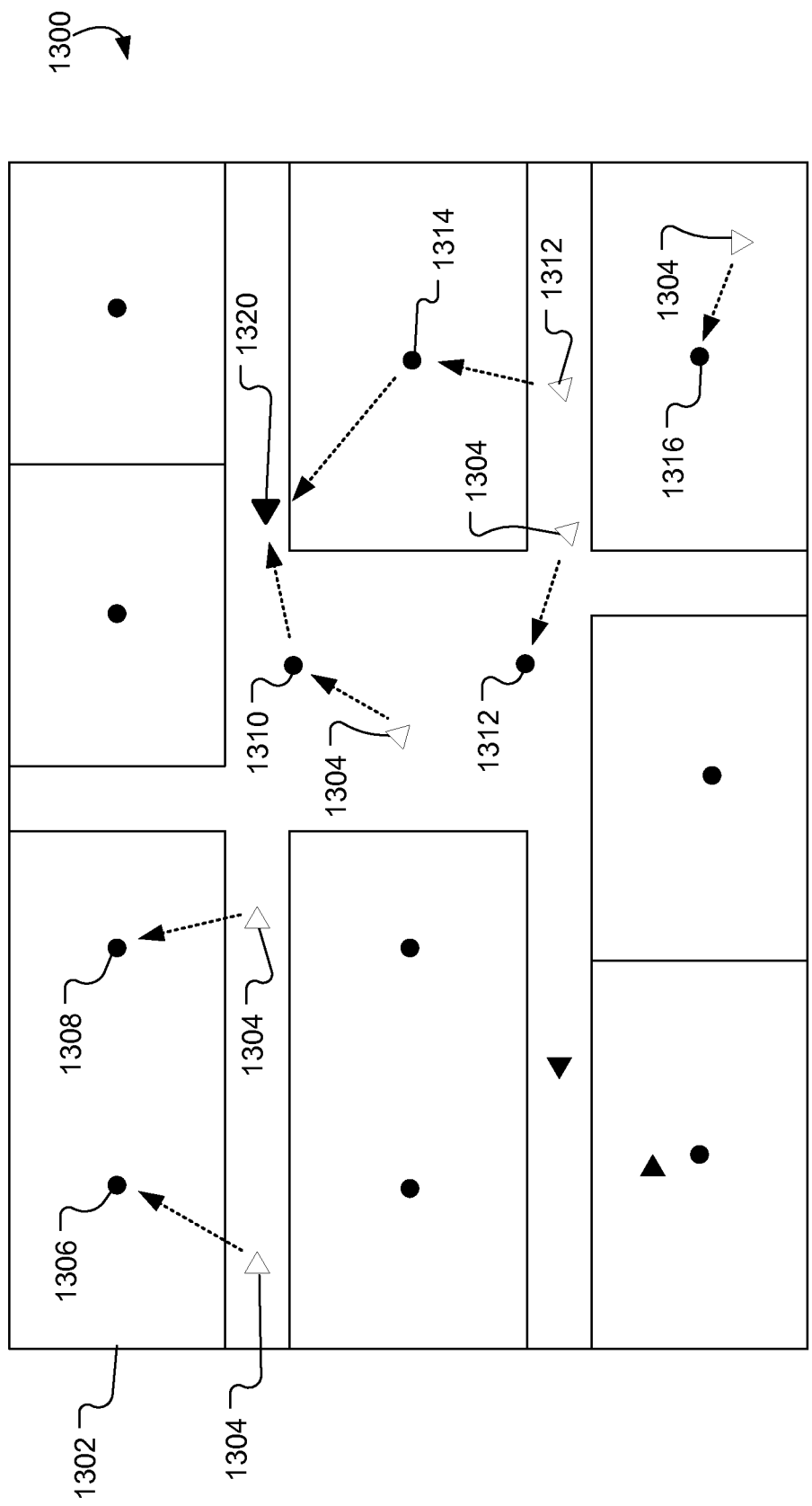
FIG. 13 illustrates an example system for determining a path that a target mobile device has taken through a building.

FIG. 13 illustrates an example system 1300 for determining a path that a target mobile device has taken through a building. For example, as target mobile device 1304 moves through building 1302, target mobile device 1304 can detect wireless transmissions from nodes 1306-1316. Since the transmission range of each node 1306-1316 and the transmission range of the target mobile device 1304 is limited (e.g., using Bluetooth/Bluetooth LE or other short range wireless technology), the target mobile device 1304 must be near each node 1306-1316 before the target mobile device can detect and connect to each node 1306-1316. Thus, as the target mobile device 1304 moves through the building 1302, the target mobile device 1304 can detect, connect to and disconnect from nodes that are proximate to the location of the target mobile device 1304.

In some implementations, each time target mobile device 1304 connects to a node (e.g., node 1306) the target mobile device 1304 can transmit its device identifier, location, and/or a token to the node. For example, the location can be a location determined by the target mobile device 1304 using the trilateration techniques described above. In some implementations, if the target mobile device 1304 cannot determine its location (e.g., not enough nodes in range), then the location of the receiving node can be stored as the location of the target mobile device 1304. When a node (e.g., node 1308, 1310, etc.) receives the device identifier, location and/or token the node can store the identifier, location information and or token in a local or networked storage location. The node can store the identifier, location and token information in association along the time (e.g., timestamp) at which the device information was received. For example, the device identifier, timestamp, location information and token can be stored in a location database.

In some implementations, the token can be data that has been signed (e.g., encrypted) by the target mobile device. The token can be distributed to other mobile devices (i.e., requesting mobile device) that are authorized to receive the location information associated with the target mobile device. For example, public key/private key type encryption can be used to sign (encrypt) the token to enable the receiving node or system to authenticate that the token was actually issued by the target mobile device. When a node receives a request for target mobile device location information, the requesting mobile device can transmit the token along with the request to the node to prove that the requesting mobile device is authorized to receive the location information stored by the node.

In some implementations, a mobile device 1320 can request location information associated with target mobile device 1304. For example, as requesting mobile device 1320 moves through building 1302, requesting mobile device 1320 can connect with the nodes (e.g., 1306-1316) in building 1302. When requesting mobile device 1320 connects with a node (e.g., node 1314, node 1310, etc.), requesting mobile device 1320 can request location information associated with target mobile device 1304. The request for location information can include a device identifier corresponding to target mobile device 1304 and a token previously received from target mobile device 1304. For example, the token can be received from target mobile device 1304 in the location sharing authorization process described with reference to FIG. 1.

When a node (e.g., node 1314, node 1310) receives the location request, including the target mobile device 1304 identifier and the target mobile device 1304 token, the node can look up the location information for the target mobile device 1304 in the location database based on the target mobile device 1304 identifier. The node can compare the token received from the requesting mobile device 1320 to the token stored in the database for target mobile device 1304. If the tokens match, the node can send the location and timestamp information to the requesting mobile device 1320.

Figure 14:
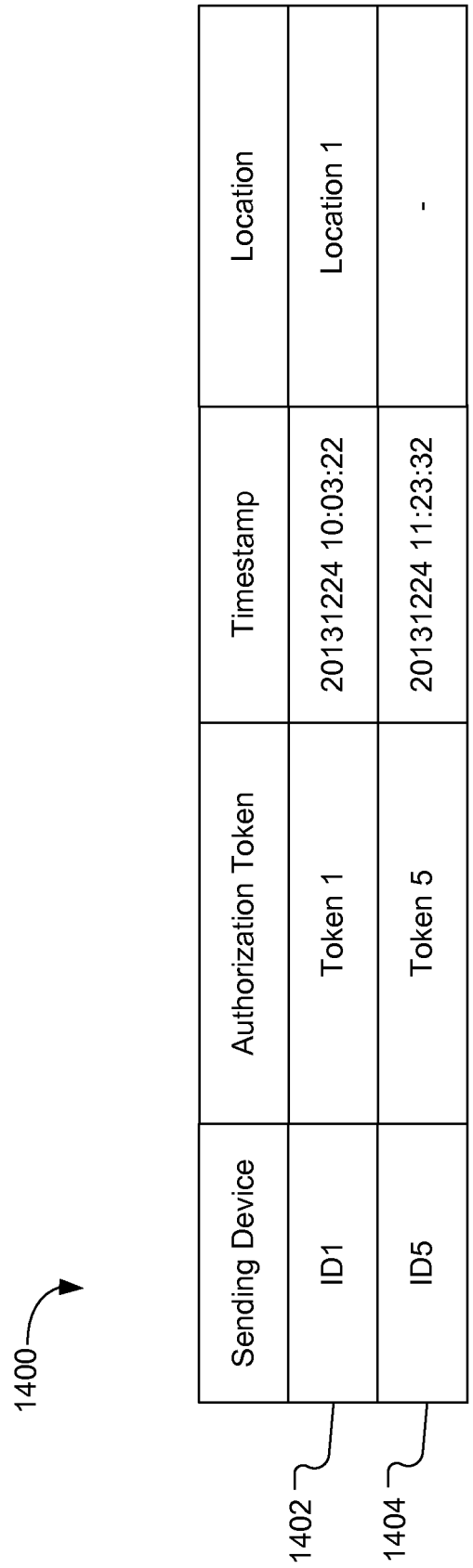
FIG. 14 illustrates an example database storing location information for a target mobile device.

FIG. 14 illustrates an example database 1400 storing location information for a target mobile device. For example, database 1400 can include records containing location information received from a target mobile device as the target mobile device connects with nodes throughout a building, as described above with reference to FIG. 13. Each node can store the database information illustrated by database 1400. The database 1400 can be stored locally at each node. The database 1400 can be stored on network storage. The database 1400 can store location information for a single node. The database 1400 can store location information aggregated from multiple nodes within the building.

In some implementations, each record (1402, 1404) in the database can include an identifier of the target mobile device, a location of the target mobile device, an authorization token associated with the target mobile device and a timestamp indicating when the location information was received by a node.

Figure 15:
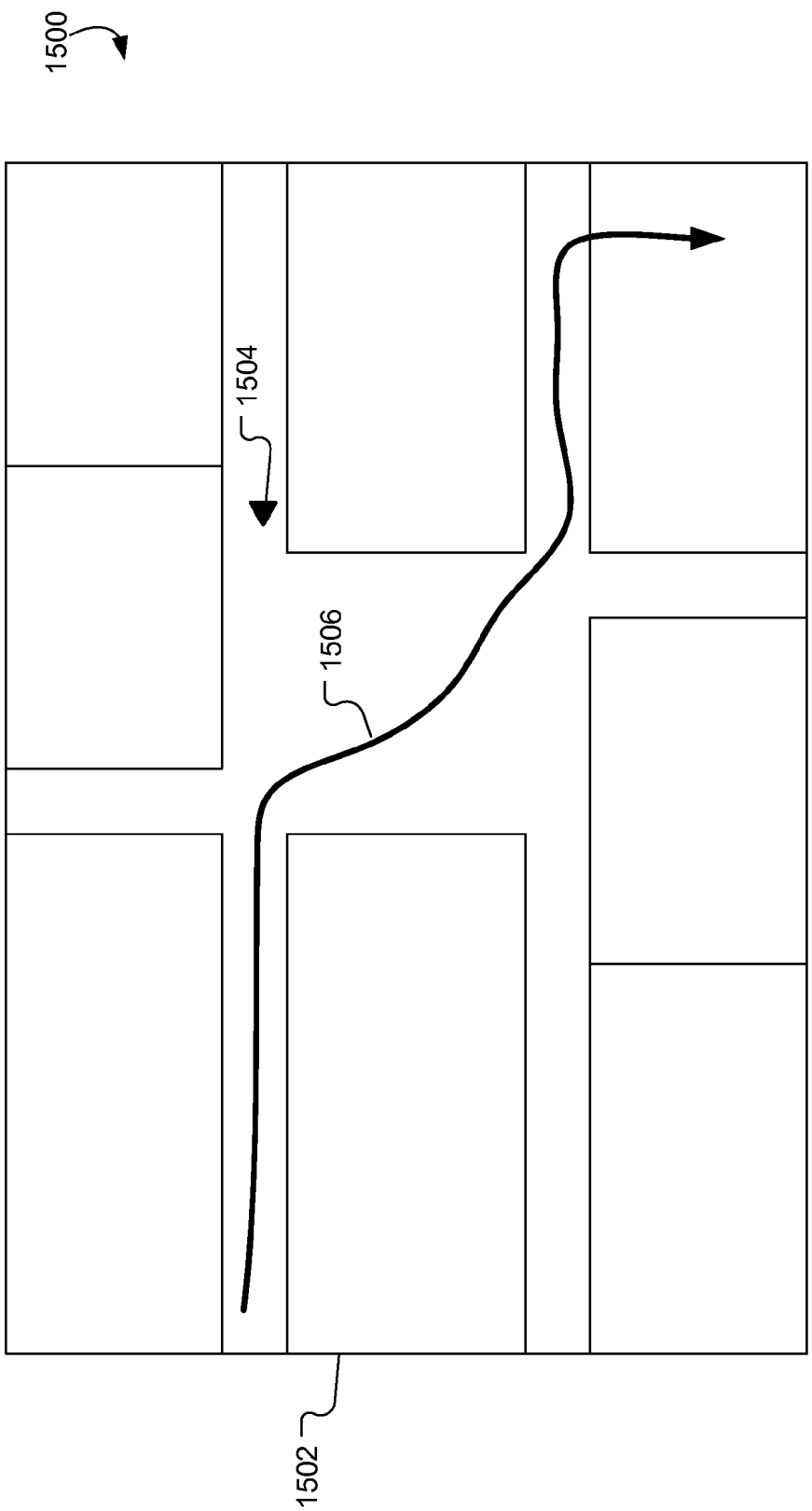
FIG. 15 illustrates an example graphical user interface for presenting on a requesting mobile device the locations and/or path of a target mobile device through a building.

FIG. 15 illustrates an example graphical user interface 1500 for presenting on a requesting mobile device the locations and/or path of a target mobile device through a building. For example, a requesting mobile device can request, from nodes within building, location information associated with a target mobile device, as described above with reference to FIGS. 13 and 14. When the requesting mobile device receives the location information, the requesting mobile device can present GUI 1500 on a display of the requesting mobile device.

In some implementations, GUI 1500 can include a graphical representation 1502 of the building. The graphical representation 1502 can include a graphical object 1504 representing the current location of the requesting mobile device within the building. The graphical representation 1502 can include a graphical object 1506 representing the path that the target mobile device took through the building. For example, the requesting mobile device can determine the path based on location information associated with the target mobile device and collected by the nodes within the building.

In some implementations, the requesting mobile device can collect location information from each node. For example, each node can store only the target mobile device location information that the node receives directly from the target mobile device. Thus, the requesting mobile device may need to collect the target mobile device location information from multiple nodes within the building.

In some implementations, the requesting mobile device can collect all of the location information associated with the target mobile device from a single node. For example, the nodes within the building can be networked and can store, in aggregate, the location information received by each node. Thus, the requesting mobile device can request location information associated with the target mobile device from a single node and receive all of the location information for the target mobile device collected by all nodes within the building.

In some implementations, when the requesting mobile device receives the location information (e.g., locations and timestamps associated with the target mobile device), the requesting mobile device can determine a path that the target mobile device took through the building. For example, based on the location and timestamp information, the requesting mobile device can determine where the target mobile device was within the building at a given time. By ordering the location data based on timestamp, the requesting mobile device can determine a path or trajectory that the target mobile device took through the building over a time period. Once the trajectory or path that the target mobile device took through the building is determined, the path (e.g., directional line 1506) can be presented on the graphical representation 1502 of the building and displayed on a graphical user interface of the requesting mobile device for the user to view.

Example Processes

Figure 16:
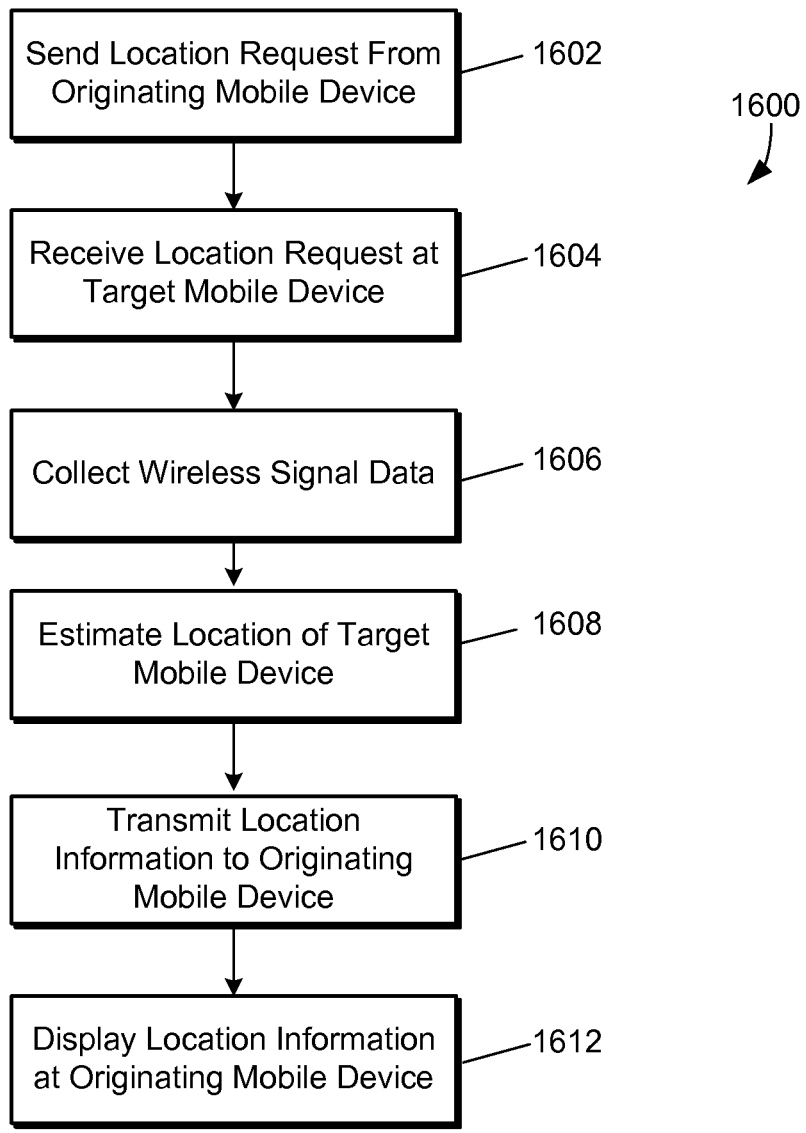
FIG. 16 is flow diagram of an example process for indoor remote triggered location scanning.

FIG. 16 is flow diagram of an example process 1600 for indoor remote triggered location scanning. For example, using process 1600 an originating device can remotely trigger an indoor location scan (e.g., location determination) at a target mobile device within a building and receive an estimated location for the target mobile device within the building.

At step 1602, the originating mobile device can send a location request to a target mobile device. For example, a user of the originating mobile device can initiate a location request by selecting an object on a user interface of the originating mobile device, as described above with reference to FIG. 2. The originating mobile device can send the location request to the target mobile device using a direct peer-to-peer connection, a series of peer-to peer connections through intermediate nodes and/or other network (e.g., Wi-Fi, LAN, WAN, etc.) connections available within a building, as described above with reference to FIGS. 3-12. The location request can include a device identifier of the target device and an authorization token (e.g., signed, encrypted data).

At step 1604, the target mobile device can receive the location request. For example, the target mobile device can receive the location request directly from the originating mobile device through a direct peer-to-peer connection. The target mobile device can receive the location request from an intermediate node through a peer-to-peer connection with the intermediate node. The target mobile device can receive the location request through another network connection (e.g., Wi-Fi, LAN, WAN, internet, etc.) or a combination of peer-to-peer and other network connections. Upon receipt of the location request, the target mobile device can compare the received authorization token to an authorization token stored at the target mobile device to determine whether the originating mobile device has been authorized by the user of the target mobile device to receive the current location of the target mobile device. If the originating mobile device is authorized to receive location information associated with the target mobile device, the target mobile device will determine and transmit its current location to the originating mobile device, as described herein. If the originating mobile device is not authorized to receive location information associated with the target mobile device, the target mobile device will ignore (drop, delete, not respond to) the location request from the originating mobile device.

At step 1606, the target mobile device can collect wireless signal data. For example, in response to receiving the location request, the target mobile device can scan for wireless signals from nodes within a building. For example, the target mobile device can detect and/or receive signals from fixed nodes (e.g., Wi-Fi access points, Bluetooth/Bluetooth LE transmitters, near field communication devices, other network devices, etc.) at known fixed locations. The target mobile device can detect and/or receive signals from mobile nodes (e.g., other mobile devices, smartphones, tablet computers, etc.) associated with determined locations. For example, the mobile nodes can dynamically determine their locations based on signal trilateration and anonymously share their locations with the target mobile device to aid in location determination when there are less than three fixed nodes available to determine the location of the target mobile device, as described above with reference to FIGS. 3-12.

At step 1608, the target mobile device can determine the current location of the target mobile device. For example, the target mobile device can determine its location based on the wireless signals received from fixed nodes and/or mobile nodes within the building. The target mobile device can estimate a precise location when signals from three or more nodes are available. The target mobile device can estimate an area in which the target mobile device is likely to be when less than three nodes are available, as described above with reference to FIGS. 3-12.

At step 1610, the target mobile device can transmit its location information to the originating mobile device. For example, the target mobile device can transmit a precise location in the building corresponding to the estimated location of the target mobile device. The target mobile device can transmit node location and distance (radius) information to the originating mobile device indicating the nodes detected by the mobile device and the estimated distances between the target mobile device and the detected nodes. In some implementations, the target mobile device can transmit node identifiers for detected nodes and signal strength data to the originating mobile device instead of the location and distance information. For example, the originating mobile device can determine node locations and distances between the target mobile device and the nodes based on the node identifiers and the signal strength data send by the target mobile device.

In some implementations, the target mobile device can transmit the location information to the originating mobile device using a direct peer-to-peer connection, a series of peer-to-peer connections through intermediate nodes, other network connections (e.g., Wi-Fi, cellular, LAN, WAN, internet, etc.) available in the building, or a combination thereof.

At step 1612, the originating mobile device can display a representation of the location information received from the target mobile device. For example, if the originating mobile device receives data indicating a precise location of the target mobile device, the originating mobile device can display a representation of the building and the respective locations of the originating mobile device and the target mobile device (FIG. 7). If the originating mobile device receives node identifiers and signal data, the originating mobile device can determine the locations of the nodes and the distances between the nodes and the target mobile device. The originating mobile device can determine an estimated location or estimated location area of the mobile device based on the node locations and distances (FIGS. 8 and 11). Once the estimated location or area is determined, the originating mobile device can present the estimated location and/or estimated area on a graphical representation of the building displayed on a display of the mobile device, as described above with reference to FIGS. 7, 9 and 12.

Figure 17:
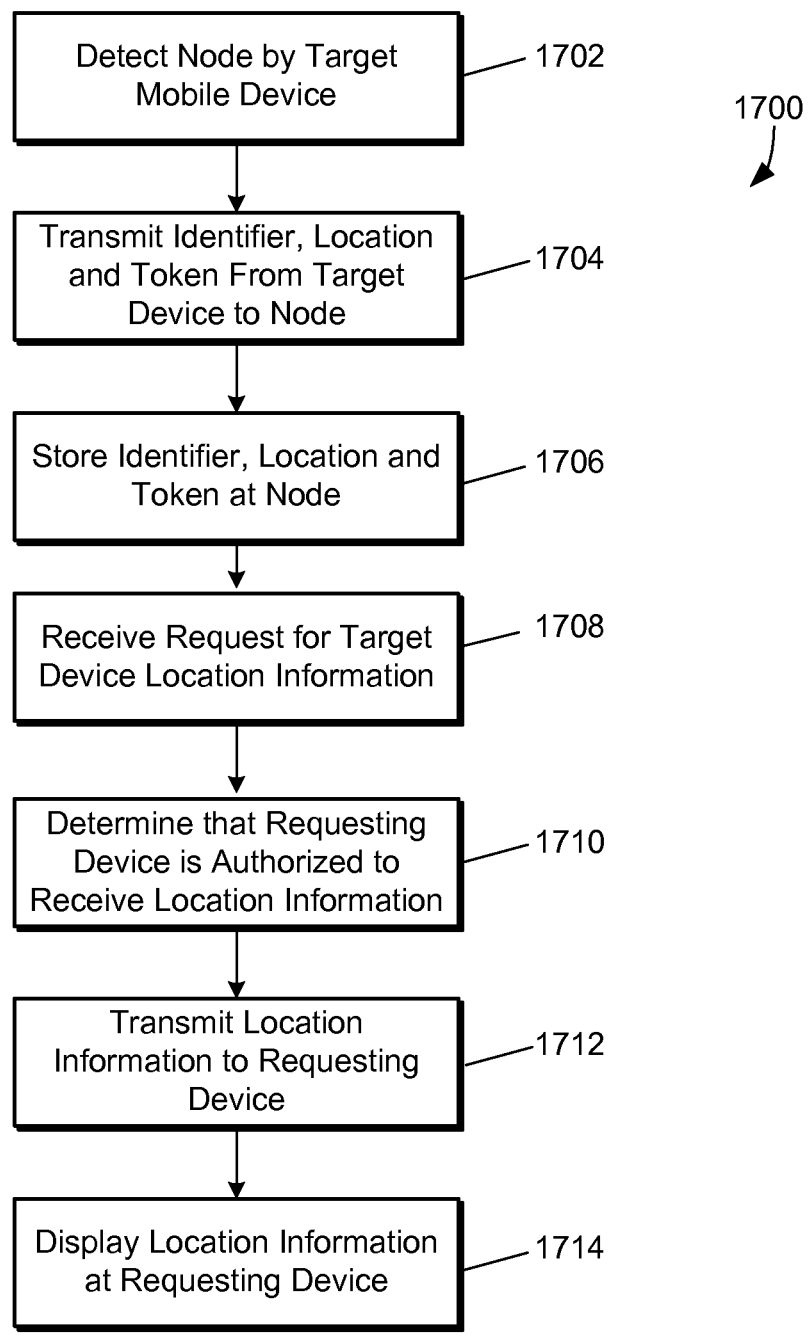
FIG. 17 is a flow diagram of an example process for indoor location tracking.

FIG. 17 is a flow diagram of an example process 1700 for indoor location tracking. For example, as a target mobile device moves through a building the target mobile device can leave information at each node that the target mobile device detects specifying an identifier of the mobile device and/or indicating the current location of the target mobile device. A requesting mobile device can request the target mobile device location information from the nodes to determine where the target mobile device has been and to determine in which direction the target mobile device was going.

At step 1702, the target mobile device can detect a node within a building. For example, the node can be a computing device with a wireless transmitter (e.g., Wi-Fi access point, wireless router, Bluetooth/Bluetooth LE device, etc.). The target mobile device can detect the node by detecting and/or receiving wireless signals from the node.

At step 1704, the target mobile device can transmit an identifier for the target mobile device, a location of the target mobile device and/or a token (e.g., authorization token) to the node. In some implementations, if the target mobile device does not know its location, the target mobile device can send its identifier and token to the node and the node will supply the location of the node as the location of the target mobile device.

At step 1706, the node can store the target mobile device identifier, location and token in a location database. For example, when the node receives the identifier, location and token, the node can determine the time at which the identifier, location and token were received, generate a timestamp representing the time of receipt and store the identifier, location, token and timestamp as a record in a location database. In some implementations, the node will generate both a timestamp and a location when the location is not provided by the target mobile device.

At step 1708, the node can receive a request for a target device's location information. For example, the node can receive the request from a requesting mobile device. The request can include a device identifier of the target mobile device and a token that the requesting mobile device previously received from the target mobile device. For example, the token can be sent from the target mobile device to the requesting mobile device when the user of the target mobile device authorizes the user of the requesting mobile device to receive location tracking information associated with the target mobile device, as described above with reference to FIG. 1.

At step 1710, the node can determine that the requesting mobile device is authorized to receive the location information associated with the target mobile device. For example, the node can look up the location information associated with the target mobile device in the location database based on the target mobile device's identifier. The node can compare the target mobile device token stored in the location database to the token received from the requesting mobile device to determine if the requesting mobile device is authorized to receive the location information associated with the target mobile device.

At step 1712, the node can transmit the requested location information to the requesting mobile device. For example, if the token provided by the requesting mobile device matches the token received from the target mobile device and stored in the location database, then the node can transmit the location information associated with the target mobile device and stored in the location database to the requesting mobile device. In some implementations, the target mobile device location information can include only the location information received by the node. In some implementations, the target mobile device location information can include all location information associated with the target mobile device collected by all nodes within the building.

At step 1714, the requesting mobile device can display the location information associated with the target mobile device on a display of the requesting mobile device. For example, the requesting mobile device can order the location information by time to generate a path or trajectory that the target mobile device took through the building. The requesting mobile device can then present a graphical user interface (e.g., GUI 1500) that presents the path that the target mobile device took through the building to the user, as described above with reference to FIGS. 14 and 15.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Example System Architecture

Figure 18:
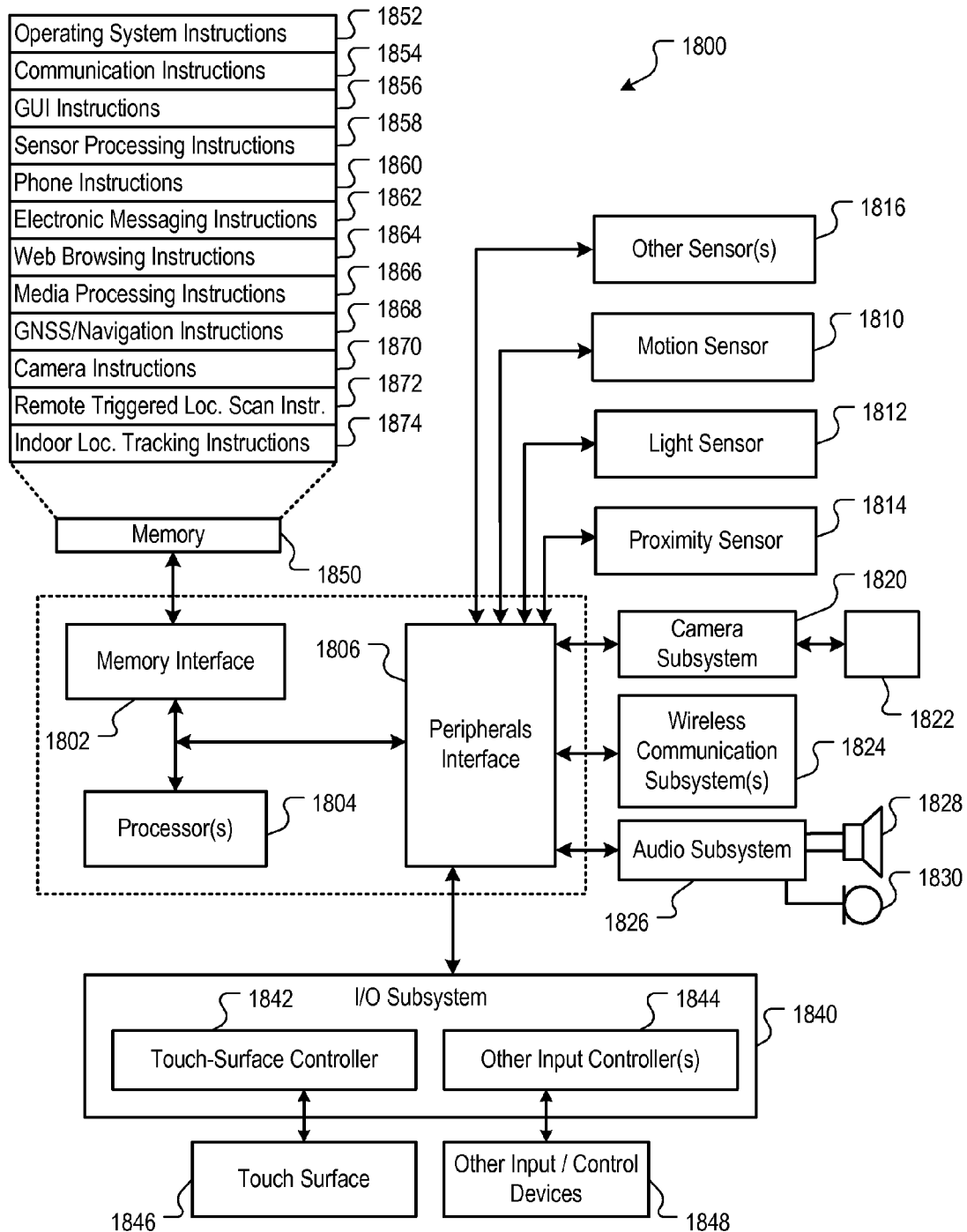
FIG. 18 is a block diagram of an example computing device that can implement the features and processes of FIGS. 1-17.

FIG. 18 is a block diagram of an example computing device 1800 that can implement the features and processes of FIGS. 1-17. The computing device 1800 can include a memory interface 1802, one or more data processors, image processors and/or central processing units 1804, and a peripherals interface 1806. The memory interface 1802, the one or more processors 1804 and/or the peripherals interface 1806 can be separate components or can be integrated in one or more integrated circuits. The various components in the computing device 1800 can be coupled by one or more communication buses or signal lines.

Sensors, devices, and subsystems can be coupled to the peripherals interface 1806 to facilitate multiple functionalities. For example, a motion sensor 1810, a light sensor 1812, and a proximity sensor 1814 can be coupled to the peripherals interface 1806 to facilitate orientation, lighting, and proximity functions. Other sensors 1816 can also be connected to the peripherals interface 1806, such as a global navigation satellite system (GNSS) (e.g., GPS receiver), a temperature sensor, a biometric sensor, magnetometer or other sensing device, to facilitate related functionalities.

A camera subsystem 1820 and an optical sensor 1822, e.g., a charged coupled device (CCD) or a complementary metal-oxide semiconductor (CMOS) optical sensor, can be utilized to facilitate camera functions, such as recording photographs and video clips. The camera subsystem 1820 and the optical sensor 1822 can be used to collect images of a user to be used during authentication of a user, e.g., by performing facial recognition analysis.

Communication functions can be facilitated through one or more wireless communication subsystems 1824, which can include radio frequency receivers and transmitters and/or optical (e.g., infrared) receivers and transmitters. The specific design and implementation of the communication subsystem 1824 can depend on the communication network (s) over which the computing device 1800 is intended to operate. For example, the computing device 1800 can include communication subsystems 1824 designed to operate over a GSM network, a GPRS network, an EDGE network, a Wi-Fi or WiMax network, and a Bluetooth™ network. In particular, the wireless communication subsystems 1824 can include hosting protocols such that the device 100 can be configured as a base station for other wireless devices.

An audio subsystem 1826 can be coupled to a speaker 1828 and a microphone 1830 to facilitate voice-enabled functions, such as speaker recognition, voice replication, digital recording, and telephony functions. The audio subsystem 1826 can be configured to facilitate processing voice commands, voiceprinting and voice authentication, for example.

The I/O subsystem 1840 can include a touch-surface controller 1842 and/or other input controller(s) 1844. The touch-surface controller 1842 can be coupled to a touch surface 1846. The touch surface 1846 and touch-surface controller 1842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1846.

The other input controller(s) 1844 can be coupled to other input/control devices 1848, such as one or more buttons, rocker switches, thumb-wheel, infrared port, USB port, and/or a pointer device such as a stylus. The one or more buttons (not shown) can include an up/down button for volume control of the speaker 1828 and/or the microphone 1830.

In one implementation, a pressing of the button for a first duration can disengage a lock of the touch surface 1846; and a pressing of the button for a second duration that is longer than the first duration can turn power to the computing device 1800 on or off. Pressing the button for a third duration can activate a voice control, or voice command, module that enables the user to speak commands into the microphone 1830 to cause the device to execute the spoken command. The user can customize a functionality of one or more of the buttons. The touch surface 1846 can, for example, also be used to implement virtual or soft buttons and/or a keyboard.

In some implementations, the computing device 1800 can present recorded audio and/or video files, such as MP3, AAC, and MPEG files. In some implementations, the computing device 1800 can include the functionality of an MP3 player, such as an iPod™. The computing device 1800 can, therefore, include a 36-pin connector that is compatible with the iPod. Other input/output and control devices can also be used.

The memory interface 1802 can be coupled to memory 1850. The memory 1850 can include high-speed random access memory and/or non-volatile memory, such as one or more magnetic disk storage devices, one or more optical storage devices, and/or flash memory (e.g., NAND, NOR). The memory 1850 can store an operating system 1852, such as Darwin, RTXC, LINUX, UNIX, OS X, WINDOWS, or an embedded operating system such as VxWorks.

The operating system 1852 can include instructions for handling basic system services and for performing hardware dependent tasks. In some implementations, the operating system 1852 can be a kernel (e.g., UNIX kernel). In some implementations, the operating system 1852 can include instructions for performing voice authentication. For example, operating system 1852 can implement the indoor remote triggered location scan features as described with reference to FIGS. 1-17.

The memory 1850 can also store communication instructions 1854 to facilitate communicating with one or more additional devices, one or more computers and/or one or more servers. The memory 1850 can include graphical user interface instructions 1856 to facilitate graphic user interface processing; sensor processing instructions 1858 to facilitate sensor-related processing and functions; phone instructions 1860 to facilitate phone-related processes and functions; electronic messaging instructions 1862 to facilitate electronic-messaging related processes and functions; web browsing instructions 1864 to facilitate web browsing-related processes and functions; media processing instructions 1866 to facilitate media processing-related processes and functions; GNSS/Navigation instructions 1868 to facilitate GNSS and navigation-related processes and instructions; and/or camera instructions 1870 to facilitate camera-related processes and functions.

The memory 1850 can store software instructions 1872 to facilitate the indoor remote triggered location scan processes and functions as described with reference to FIGS. 1-17. The memory 1850 can store software instructions 1874 to facilitate the indoor location tracking processes and functions as described with reference to FIGS. 1-17.

The memory 1850 can also store other software instructions (not shown), such as web video instructions to facilitate web video-related processes and functions; and/or web shopping instructions to facilitate web shopping-related processes and functions. In some implementations, the media processing instructions 1866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1850 can include additional instructions or fewer instructions. Furthermore, various functions of the computing device 1800 can be implemented in hardware and/or in software, including in one or more signal processing and/or application specific integrated circuits.

The invention claimed is:

1. A method comprising:
receiving, by a first intermediate node, first location information for a target mobile device, the first location information provided by the target mobile device to the intermediate node through a wireless connection between the intermediate node and the target mobile device, wherein the first intermediate node and the target mobile device are located in an indoor environment;
storing, by the first intermediate node, the first location information including a first location of the target mobile device, a first timestamp and data identifying the target mobile device;
determining, by the first intermediate node, that an originating mobile device is authorized to retrieve location information associated with the target mobile device;
obtaining, by the first intermediate node, second location information for the target mobile device from a second intermediate node in the indoor environment, the second location information including a second location of the target mobile device, a second timestamp and data identifying the target mobile device, where the second location and the second timestamp are different than the first location and the first timestamp;
storing, by the first intermediate node, the second location information;
receiving, by the first intermediate node, a location request for the target mobile device initiated by the originating mobile device; and
transmitting, by the first intermediate node, the first and second location information to the originating mobile device.

2. The method of claim 1, wherein the receiving and transmitting are performed using peer-to-peer wireless connections between the originating mobile device, the first intermediate node and the target mobile device.

3. The method of claim 2, wherein the receiving and transmitting are performed using Bluetooth low energy signals.

4. The method of claim 1, further comprising:
obtaining third location information for the target mobile device from a third intermediate node including a third location of the target mobile device, a third timestamp and data identifying the target mobile device, where the third location and the third timestamp are different than the first and second locations and the first and second timestamps, and
transmitting, by the first intermediate node, the first, second and third location information to the originating mobile device.

5. The method of claim 1, wherein the first or second intermediate node is a mobile device.

6. The method of claim 1, wherein the first and second location information indicates an area within a building where the target mobile device is located.

7. The method of claim 1, wherein the location request includes a first authorization token and the first and second location information include second and third authorization tokens, respectively, the first intermediate node compares the first authorization token to the second and third authorization tokens to determine a match, and transmits the first and second location information to the originating mobile device in response to the first, second and third tokens matching.

8. A non-transitory computer-readable medium encoded with one or more sequences of instructions which, when executed by one or more processors, causes:
- receiving, by a first intermediate node, first location information for a target mobile device, the first location information provided by the target mobile device to the intermediate node through a wireless connection between the intermediate node and the target mobile device, wherein the first intermediate node and the target mobile device are located in an indoor environment;
- storing, by the intermediate node, the first location information including a first location of the target mobile device, a first timestamp and data identifying the target mobile device;
- determining, by the first intermediate node, that an originating mobile device is authorized to retrieve location information associated with the target mobile device;
- obtaining, by the first intermediate node, second location information for the target mobile device from a second intermediate node in the indoor environment, the second location information including a second location of the target mobile device, a second timestamp and data identifying the target mobile device, where the second location and the second timestamp are different than the first location and the first timestamp
- storing, by the first intermediate node, the second location information;
- receiving, by the intermediate node, a location request for the target mobile device initiated by the originating mobile device; and
- transmitting, by the first intermediate node, the first and second location information to the originating mobile device.

9. The non-transitory computer-readable medium of claim 8, wherein the receiving and transmitting are performed using peer-to-peer wireless connections between the originating mobile device, the first intermediate node and the target mobile device.

10. The non-transitory computer-readable medium of claim 9, further comprising: obtaining third location information for the target mobile device from a third intermediate node including a third location of the target mobile device, a third timestamp and data identifying the target mobile device, where the third location and the third timestamp are different than the first and second locations and the first and second timestamps; and transmitting, by the first intermediate node, the first, second and third location information to the originating mobile device.

11. The non-transitory computer-readable medium of claim 8, wherein the receiving and transmitting are performed by two or more intermediate nodes.

12. The non-transitory computer-readable medium of claim 8, wherein the first or second intermediate node is a mobile device.

13. The non-transitory computer-readable medium of claim 8, wherein the first and second location information indicates an area within a building where the target mobile device is located.

14. The non-transitory computer-readable medium of claim 8, wherein the location request includes a first authorization token and the first and second location information include second and third authorization tokens, respectively, the first intermediate node compares the first authorization token to the second and third authorization tokens to determine a match, and transmits the first and second location information to the originating mobile device in response to the first, second and third tokens matching.

15. A node in a wireless system comprising:
- one or more processors;
- a wireless transceiver;
- a computer-readable medium encoded with one or more sequences of instructions which, when executed by the one or more processors, causes:
- receiving, by the wireless transceiver, first location information for a target mobile device, the first location information provided by the target mobile device through a wireless connection between the intermediate node and the target mobile device, wherein the node and the target mobile device are located in an indoor environment;
- storing, by the node, the first location information including a first location of the target mobile device, a first timestamp and data identifying the target mobile device;
- determining that an originating mobile device is authorized to retrieve location information associated with the target mobile device;
- obtaining, by the node, second in the indoor environment location information for the target mobile device from a second node in the wireless system, the second location information including a second location of the target mobile device, a second timestamp and data identifying the target mobile device, where the second location and the second timestamp are different than the first location and the first timestamp
- storing, by the node, the second location information;
- receiving, by the wireless transceiver, a location request for the target mobile device initiated by the originating mobile device; and
- transmitting the first and second location information to the originating mobile device.

16. The node of claim 15, wherein the receiving and transmitting are performed using peer-to-peer wireless connections between the originating mobile device, the target mobile device and the node.

17. The node of claim 16, wherein the receiving and transmitting are performed using Bluetooth low energy signals.

18. The node of claim 15, further comprising:
- obtaining third location information for the target mobile device from a third node including a third location of the target mobile device, a third timestamp and data identifying the target mobile device, where the third location and the third timestamp are different than the first and second locations and the first and second timestamps; and
- transmitting, by the node, the first, second and third location information to the originating mobile device.

19. The system of claim 18, wherein at least one node is a mobile device.

20. The node of claim 15, wherein the location information indicates an area within a building where the nodes are located.

21. The node of claim 15, wherein the location request includes a first authorization token and the first and second location information include second and third authorization tokens, respectively, the first intermediate node compares the first authorization token to the second and third authorization tokens to determine a match, and transmits the first and second location information to the originating mobile device in response to the first, second and third tokens matching.

\* \* \* \* \*